US012744823B2

(12) United States Patent
Uzelac et al.

(10) Patent No.: US 12,744,823 B2
(45) Date of Patent: *Sep. 22, 2026

(54) MONITORING AND DETECTION OF FRAUDULENT OR UNAUTHORIZED USE IN TELEPHONE CONFERENCING SYSTEMS OR VOICE NETWORKS

(71) Applicant: Level 3 Communications, LLC, Denver, CO (US)

(72) Inventors: Adam Uzelac, Rochester, NY (US); Andrew J. Broadworth, Thornton, CO (US); Robert P. Slaughter, West Monroe, LA (US)

(73) Assignee: Level 3 Communications, LLC, Denver, CO (US)

( * ) Notice: Subject to any disclaimer, the term of this patent is extended or adjusted under 35 U.S.C. 154(b) by 113 days.

This patent is subject to a terminal disclaimer.

(21) Appl. No.: 18/890,345

(22) Filed: Sep. 19, 2024

(65) Prior Publication Data

US 2025/0039246 A1 Jan. 30, 2025

Related U.S. Application Data

(63) Continuation of application No. 18/216,033, filed on Jun. 29, 2023, now Pat. No. 12,101,358, which is a (Continued)

(51) Int. Cl.
*H04L 9/40* (2022.01)
*H04L 61/5007* (2022.01)
(Continued)

(52) U.S. Cl.
CPC ............ *H04L 63/304* (2013.01); *H04L 63/10* (2013.01); *H04L 63/308* (2013.01);
(Continued)

(58) Field of Classification Search
CPC ..... H04L 63/304; H04L 63/101; H04L 63/10; H04L 63/308; H04L 67/306;
(Continued)

(56) References Cited

U.S. PATENT DOCUMENTS 7,440,558 B2 10/2008 Heilmann
8,176,001 B2 5/2012 Mantripragada
(Continued)

*Primary Examiner* — Hosuk Song

(57) ABSTRACT

Novel tools and techniques are provided for implementing monitoring and detection of fraudulent or unauthorized use in telephone conferencing systems or voice networks. In various embodiments, a computing system might monitor call activity through telephone conferencing system or voice network. In response to detecting use of the telephone conferencing system or voice network by at least one party based on the monitored call activity, the computing system might identify incoming and/or outgoing associated with a call initiated by the at least one party. The computing system might analyze the identified incoming and/or outgoing call data to determine whether the call initiated by the at least one party constitutes at least one of fraudulent use or unauthorized use of the telephone conferencing system or voice network. If so, the computing system might initiate one or more first actions.

18 Claims, 12 Drawing Sheets

Related U.S. Application Data continuation of application No. 17/547,957, filed on Dec. 10, 2021, now Pat. No. 11,695,805, which is a continuation of application No. 16/600,712, filed on Oct. 14, 2019, now Pat. No. 11,206,289.

(60) Provisional application No. 62/848,720, filed on May 16, 2019.

(51) Int. Cl.

| | |
|---|---|
| ***H04L 67/306*** | (2022.01) |
| ***H04M 3/42*** | (2006.01) |
| ***H04M 3/56*** | (2006.01) |
| ***H04W 12/02*** | (2009.01) |

(52) U.S. Cl.

CPC ...... *H04L 67/306* (2013.01); *H04M 3/42059* (2013.01); *H04M 3/56* (2013.01); *H04W 12/02* (2013.01); *H04L 61/5007* (2022.05); *H04L 2463/121* (2013.01)

(58) Field of Classification Search

CPC .......... H04L 61/2007; H04L 2463/121; H04M 3/42059; H04M 3/56; H04W 12/02; H04W 12/03

See application file for complete search history.

(56) References Cited

U.S. PATENT DOCUMENTS

| | | | | |
|---|---|---|---|---|
| 8,428,227 | B2 | 4/2013 | Angel | |
| 8,582,567 | B2 | 11/2013 | Kurapati | |
| 8,761,353 | B1 * | 6/2014 | Apple | H04M 15/08 379/207.02 |
| 8,798,035 | B1 | 8/2014 | Passe | |
| 8,806,630 | B2 | 8/2014 | Qiu | |
| 9,058,607 | B2 | 6/2015 | Ganti | |
| 9,167,078 | B2 | 10/2015 | Spievak | |
| 9,191,351 | B2 | 11/2015 | Tai | |
| 9,503,570 | B2 | 11/2016 | Aggarwal | |
| 9,614,974 | B1 | 4/2017 | Hodge | |
| 9,696,346 | B2 | 7/2017 | Pietrowicz | |
| 9,699,309 | B2 * | 7/2017 | Spievak | H04M 3/436 |
| 9,801,158 | B1 | 10/2017 | Yuan | |
| 9,961,198 | B2 * | 5/2018 | Spievak | H04M 3/436 |
| 10,015,676 | B2 | 7/2018 | Alvarez Dominguez | |
| 10,477,403 | B2 | 11/2019 | Flaks | |
| 10,863,021 | B2 | 12/2020 | Hodge | |
| 11,115,521 | B2 | 9/2021 | Roderick | |
| 11,206,289 | B2 | 12/2021 | Uzelac | |
| 11,277,510 | B2 | 3/2022 | Broadworth | |
| 11,310,278 | B2 | 4/2022 | Vasanthapuram | |
| 11,356,473 | B2 * | 6/2022 | Broadworth | H04L 65/1046 |
| 11,689,542 | B2 | 6/2023 | Chattopadhyaya | |
| 11,695,805 | B2 | 7/2023 | Uzelac | |
| 11,750,644 | B2 * | 9/2023 | Broadworth | H04L 65/1046 726/24 |
| 11,778,091 | B2 * | 10/2023 | Hodge | H04L 65/403 379/189 |
| 12,101,358 | B2 * | 9/2024 | Uzelac | H04L 63/10 |
| 2020/0366719 | A1 | 11/2020 | Uzelac | |
| 2023/0344875 | A1 | 10/2023 | Uzelac | |

* cited by examiner

Identify, with the computing system, at least one of incoming call data or outgoing call data associated with a call initiated by the at least one party

415

Obtain the at least one of the incoming call data or the outgoing call data by scraping an application log file associated with the telephone conferencing system or voice network

450

Obtain the at least one of the incoming call data or the outgoing call data by using a tracking service

460

Obtain the at least one of the incoming call data or the outgoing call data byusing an application programming interface ("API") between the computing system and the telephone conferencing system or voice network

455

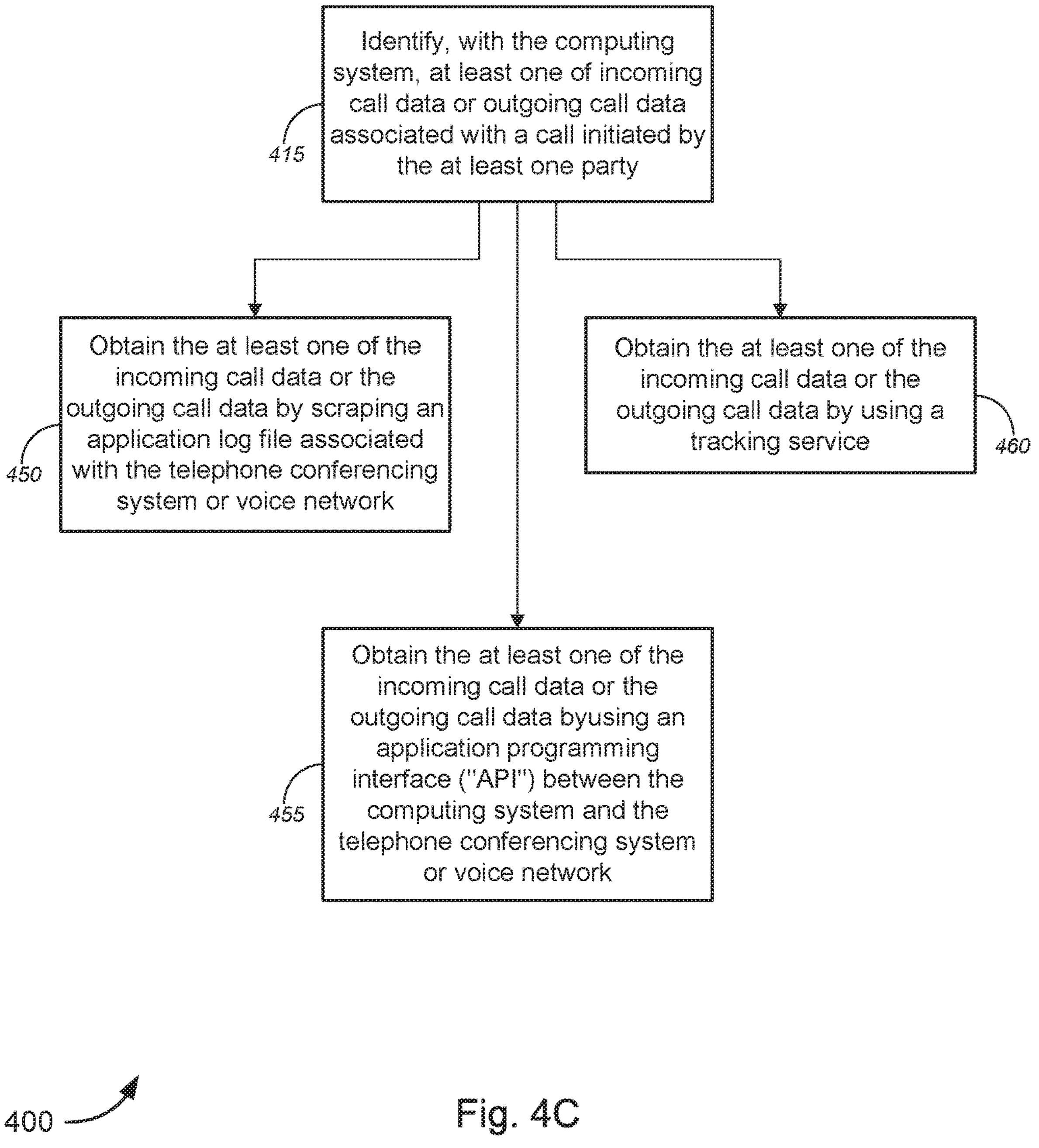

Fig. 4C

MONITORING AND DETECTION OF FRAUDULENT OR UNAUTHORIZED USE IN TELEPHONE CONFERENCING SYSTEMS OR VOICE NETWORKS

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatuses for implementing monitoring and detection of fraudulent or unauthorized use, and, more particularly, to methods, systems, and apparatuses for implementing monitoring and detection of fraudulent or unauthorized use in telephone conferencing systems or voice networks.

BACKGROUND

In conventional telephone conference systems or voice networks, fraudulent and/or unauthorized usage is rampant and mostly unchecked. In particular, in conventional telephone conference systems or voice networks, it is difficult to identify fraudulent and/or unauthorized usage (e.g., users guessing a chairperson or leader code or personal identification number ("PIN") after already identifying a valid telephone conference account; a user(s) using the telephone conference system or voice network to initiate bulk calls, robocalls, denial of service ("DoS") attacks; a user(s) using the telephone conference system or voice network to hide their identity; a user(s) using the telephone conference system or voice network to bypass long distance or other telephone charges; etc.).

Hence, there is a need for more robust and scalable solutions for implementing monitoring and detection of fraudulent or unauthorized use, and, more particularly, to methods, systems, and apparatuses for implementing monitoring and detection of fraudulent or unauthorized use in telephone conferencing systems or voice networks.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

FIGS. 4A-4E are flow diagrams illustrating a method for implementing monitoring and detection of fraudulent or unauthorized use in telephone conferencing systems or voice networks, in accordance with various embodiments.

DETAILED DESCRIPTION OF CERTAIN EMBODIMENTS

Overview

Figure 1:
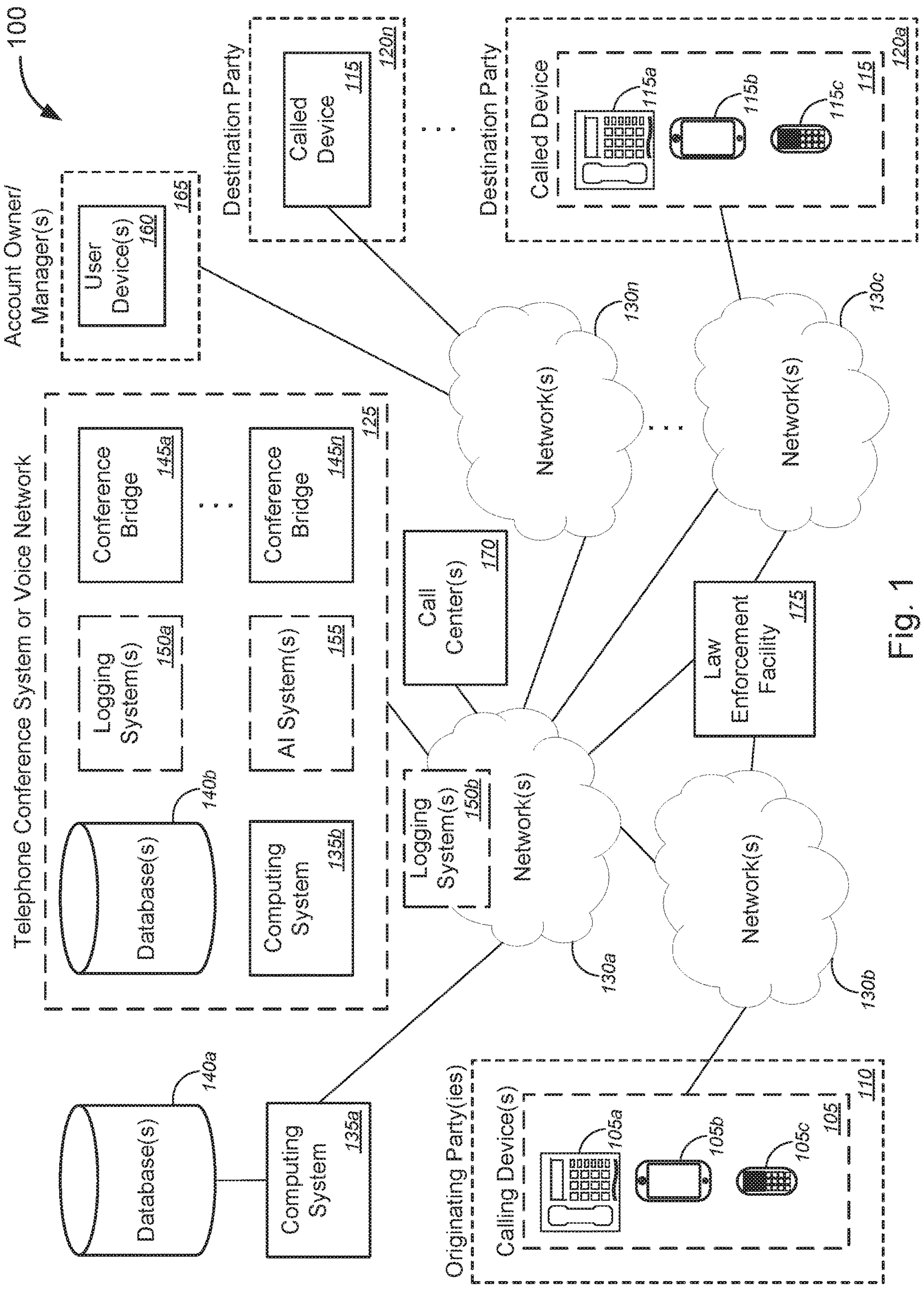
FIG. 1 is a schematic diagram illustrating a system for implementing monitoring and detection of fraudulent or unauthorized use in telephone conferencing systems or voice networks, in accordance with various embodiments.

Various embodiments provide tools and techniques for implementing monitoring and detection of fraudulent or unauthorized use, and, more particularly, to methods, systems, and apparatuses for implementing monitoring and detection of fraudulent or unauthorized use in telephone conferencing systems or voice networks.

In various embodiments, a computing system might monitor call activity through telephone conferencing system or voice network. In response to detecting use of the telephone conferencing system or voice network by at least one party based on the monitored call activity, the computing system might identify at least one of incoming call data or outgoing call data associated with a call initiated by the at least one party. The computing system might analyze the identified at least one of incoming call data or outgoing call data to determine whether the call initiated by the at least one party constitutes at least one of fraudulent use or unauthorized use of the telephone conferencing system or voice network. Based on a determination that the call initiated by the at least one party constitutes at least one of fraudulent use or unauthorized use of the telephone conferencing system or voice network, the computing system might initiate one or more first actions.

In some embodiments, the incoming call data might include, without limitation, at least one of conference identification information associated with a conference bridge, timestamp of call origination by each call-in party to the conference bridge, origination telephone number associated with each call-in party, geographic location information associated with each call-in party, or line identifier (e.g., network line, conference line, media resource line, or the like) corresponding to connection between each call-in party and the conference bridge, and/or the like. In some cases, the outgoing call data might include, but is not limited to, at least one of conference identification information associated with a conference bridge, timestamp of call origination by each call-out party from the conference bridge, destination telephone number associated with each destination party called by each call-out party, geographic location information associated with each call-out party, line identifier (e.g., network line, conference line, media resource line, or the like) corresponding to connection between each destination party and the conference bridge, or telephone number associated with each call-out party, and/or the like. In some instances, the call might be initiated by web control by the at least one parties, and the identified at least one of incoming call data or outgoing call data might include, without limitation, at least one of conference identification information associated with a conference bridge, timestamp of call origination by each call-in party to the conference bridge, timestamp of call origination by each call-out party from the conference bridge, geographic location information associated with each call-in party, geographic location information associated with each call-out party, Internet protocol ("IP") address associated with each call-in party, IP address associated with each call-out party, or WebSocket connection information, and/or the like.

According to some embodiments, identifying the at least one of the incoming call data or the outgoing call data associated with a call initiated by the at least one party might comprise obtaining the at least one of the incoming call data or the outgoing call data by at least one of scraping an application log file associated with the telephone conferencing system or voice network (not shown), using an application programming interface ("API") between the computing system and the telephone conferencing system or voice network (not shown), or using a tracking service (not shown), and/or the like.

In some embodiments, the one or more first actions might include, but is not limited to, at least one of temporarily blocking a network trunk; escalating disablement of a network trunk; permanently blocking a network trunk; temporarily blocking an account with the telephone conferencing system; escalating disablement of an account with the telephone conferencing system; permanently blocking an account with the telephone conferencing system; blocking one or more features of an account with the telephone conferencing system; changing routing of the call to route through specialized equipment for monitoring or recording the call; changing routing of the call to route to a call center; changing routing of the call to route to a law enforcement facility; changing routing of the call to route to a message service; changing routing of the call to route to an interactive voice response ("IVR") system; changing routing of the call to terminate the call; sending an alert regarding the call to at least one of an account owner, an account manager, a call center representative, or a law enforcement representative; sending an e-mail message regarding the call to at least one of an account owner, an account manager, a call center representative, or a law enforcement representative; sending a short message service ("SMS") message regarding the call to at least one of an account owner, an account manager, a call center representative, or a law enforcement representative; sending a text message regarding the call to at least one of an account owner, an account manager, a call center representative, or a law enforcement representative; initiating a telephone call regarding the call to at least one of an account owner, an account manager, a call center representative, or a law enforcement representative; or logging information regarding the call to a log file or a database system; and/or the like.

In some cases, at least one of the alert, the e-mail message, the SMS message, the text message, or the telephone call, and/or the like, might comprise at least one of an option to block access to the account by the at least one party, an option to change account credentials associated with the account, an option to contact the account owner, or an option to disconnect the call, based at least in part on a determination that the call is deemed by the at least one of the account owner, the account manager, the call center representative, or the law enforcement representative to be at least one of fraudulent use or unauthorized use of the telephone conferencing system or voice network, and/or the like.

These and other aspects of the fraudulent or unauthorized use detection in telephone conferencing systems or voice networks are described in greater detail with respect to the figures.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Various embodiments described herein, while embodying (in some cases) software products, computer-performed methods, and/or computer systems, represent tangible, concrete improvements to existing technological areas, including, without limitation, teleconferencing or telephone conferencing technology, telephone conference or voice network monitoring technology, and/or the like. In other aspects, certain embodiments, can improve the functioning of user equipment or systems themselves (e.g., teleconferencing or telephone conferencing systems, telephone conference or voice network monitoring systems, etc.), for example, by monitoring, with a computing system, call activity through a telephone conferencing system or voice network; in response to detecting use of the telephone conferencing system or voice network by at least one party based on the monitored call activity, identifying, with the computing system, at least one of incoming call data or outgoing call data associated with a call initiated by the at least one party; analyzing, with the computing system, the identified at least one of incoming call data or outgoing call data to determine whether the call initiated by the at least one party constitutes at least one of fraudulent use or unauthorized use of the telephone conferencing system or voice network; and based on a determination that the call initiated by the at least one party constitutes at least one of fraudulent use or unauthorized use of the telephone conferencing system or voice network, initiating, with the computing system, one or more first actions; and/or the like.

In particular, to the extent any abstract concepts are present in the various embodiments, those concepts can be implemented as described herein by devices, software, systems, and methods that involve specific novel functionality (e.g., steps or operations), such as, in response to detecting use of the telephone conferencing system or voice network by at least one party based on the monitored call activity, identifying, with the computing system, at least one of incoming call data or outgoing call data associated with a call initiated by the at least one party; analyzing, with the computing system, the identified at least one of incoming call data or outgoing call data to determine whether the call initiated by the at least one party constitutes at least one of fraudulent use or unauthorized use of the telephone conferencing system or voice network; and based on a determination that the call initiated by the at least one party constitutes at least one of fraudulent use or unauthorized use of the telephone conferencing system or voice network, initiating, with the computing system, one or more first actions; and/or the like, to name a few examples, that extend beyond mere conventional computer processing operations. These functionalities can produce tangible results outside of the implementing computer system, including, merely by way of example, optimized monitoring and tracking of usage of telephone conference systems or voice networks to detect fraudulent or unauthorized usage and to implement actions to address the detected fraudulent or unauthorized usage, and/or the like, at least some of which may be observed or measured by customers and/or service providers.

In an aspect, a method might comprise monitoring, with a computing system, call activity through a telephone conferencing system or voice network; in response to detecting use of the telephone conferencing system or voice network by at least one party based on the monitored call activity, identifying, with the computing system, at least one of incoming call data or outgoing call data associated with a call initiated by the at least one party; analyzing, with the computing system, the identified at least one of incoming call data or outgoing call data to determine whether the call initiated by the at least one party constitutes at least one of fraudulent use or unauthorized use of the telephone conferencing system or voice network; and based on a determination that the call initiated by the at least one party constitutes at least one of fraudulent use or unauthorized use of the telephone conferencing system or voice network, initiating, with the computing system, one or more first actions.

In some embodiments, the incoming call data might comprise at least one of conference identification information associated with a conference bridge, timestamp of call origination by each call-in party to the conference bridge, origination telephone number associated with each call-in party, geographic location information associated with each call-in party, or line identifier (e.g., network line, conference line, media resource line, or the like) corresponding to connection between each call-in party and the conference bridge, and/or the like. In some cases, the outgoing call data might comprise at least one of conference identification information associated with a conference bridge, timestamp of call origination by each call-out party from the conference bridge, destination telephone number associated with each destination party called by each call-out party, geographic location information associated with each call-out party, line identifier (e.g., network line, conference line, media resource line, or the like) corresponding to connection between each destination party and the conference bridge, or telephone number associated with each call-out party, and/or the like. In some instances, the call might be initiated by web control, wherein the identified at least one of incoming call data or outgoing call data might comprise at least one of conference identification information associated with a conference bridge, timestamp of call origination by each call-in party to the conference bridge, timestamp of call origination by each call-out party from the conference bridge, geographic location information associated with each call-in party, geographic location information associated with each call-out party, Internet protocol ("IP") address associated with each call-in party, IP address associated with each call-out party, or WebSocket connection information, and/or the like.

According to some embodiments, identifying the at least one of the incoming call data or the outgoing call data associated with a call initiated by the at least one party might comprise obtaining the at least one of the incoming call data or the outgoing call data by at least one of scraping an application log file associated with the telephone conferencing system or voice network, using an application programming interface ("API") between the computing system and the telephone conferencing system or voice network, or using a tracking service, and/or the like.

Merely by way of example, in some instances, determining whether the call initiated by the at least one party constitutes at least one of fraudulent use or unauthorized use of the telephone conferencing system or voice network might comprise comparing, with the computing system, the identified at least one of incoming call data or outgoing call data with metadata, wherein the metadata might comprise at least one of account identifier associated with a user account with the telephone conferencing system or voice network, a telephone number associated with an account owner associated with the user account, geographic information associated with the account owner, or contact information associated with the account owner, and/or the like.

Alternatively, or additionally, determining whether the call initiated by the at least one party constitutes at least one of fraudulent use or unauthorized use of the telephone conferencing system or voice network might comprise determining that the at least one party is an unauthorized user who is using a user account with the telephone conferencing system or voice network for personal use or to sell to unsuspecting end-users, by at least one of determining that a personal identification number ("PIN") or leader code associated with the user account has been incorrectly entered more than a predetermined number of times, determining that an origination telephone number associated with the at least one party does not match a telephone number associated with an account owner associated with the user account, determining that the at least one party is calling from a location that is different from geographic location associated with the account owner, determining that the at least one party is calling from a location that has a known propensity for initiating fraudulent calls, or determining that at least one of one or more destination parties is located in a foreign country, and/or the like.

Alternatively, or additionally, determining whether the call initiated by the at least one party constitutes at least one of fraudulent use or unauthorized use of the telephone conferencing system or voice network might comprise one of determining that the at least one party is using the telephone conferencing system or voice network as a bulk call generator, determining that the at least one party is using the telephone conferencing system or voice network as an originator of robocalls, or determining that the at least one party is using the telephone conferencing system or voice network as part of a denial of service ("DoS") attack, and/or the like, by at least one of determining that a number of out-dials from a single user account with the telephone conferencing system or voice network exceeds a predetermined threshold number of calls within a predetermined period, determining that the at least one party is calling from a location that has a known propensity for initiating fraudulent calls, determining that the at least one party is located in a foreign country, or determining that at least one of one or more destination parties is located in a foreign country, and/or the like.

Alternatively, or additionally, determining whether the call initiated by the at least one party constitutes at least one of fraudulent use or unauthorized use of the telephone conferencing system or voice network might comprise determining that the at least one party is attempting to hide its identity or to hide direct communications by the at least one party, by at least one of determining that an origination telephone number associated with the at least one party does not match a telephone number associated with an account owner associated with the user account or determining that the at least one party is calling from a location that is different from geographic location associated with the account owner, or the like.

Alternatively, or additionally, determining whether the call initiated by the at least one party constitutes at least one of fraudulent use or unauthorized use of the telephone conferencing system or voice network might comprise determining that the at least one party is attempting to bypass long distance charges, by at least one of determining that an origination telephone number associated with the at least one party does not match a telephone number associated with an account owner associated with the user account, determining that the at least one party is calling from a location that is different from geographic location associated with the account owner, or determining that the call would be subject to long distance charges if initiated without using the telephone conferencing system, and/or the like.

Alternatively, or additionally, determining whether the call initiated by the at least one party constitutes at least one of fraudulent use or unauthorized use of the telephone conferencing system or voice network might comprise utilizing at least one of an artificial intelligence ("AI") system or a machine learning system, and/or the like, to determine whether the call initiated by the at least one party constitutes at least one of fraudulent use or unauthorized use of the telephone conferencing system or voice network.

In some embodiments, the one or more first actions might comprise at least one of temporarily blocking a network trunk; escalating disablement of a network trunk; permanently blocking a network trunk; temporarily blocking an account with the telephone conferencing system; escalating disablement of an account with the telephone conferencing system; permanently blocking an account with the telephone conferencing system; blocking one or more features of an account with the telephone conferencing system; changing routing of the call to route through specialized equipment for monitoring or recording the call; changing routing of the call to route to a call center; changing routing of the call to route to a law enforcement facility; changing routing of the call to route to a message service; changing routing of the call to route to an interactive voice response ("IVR") system; changing routing of the call to terminate the call; sending an alert regarding the call to at least one of an account owner, an account manager, a call center representative, or a law enforcement representative; sending an e-mail message regarding the call to at least one of an account owner, an account manager, a call center representative, or a law enforcement representative; sending a short message service ("SMS") message regarding the call to at least one of an account owner, an account manager, a call center representative, or a law enforcement representative; sending a text message regarding the call to at least one of an account owner, an account manager, a call center representative, or a law enforcement representative; initiating a telephone call regarding the call to at least one of an account owner, an account manager, a call center representative, or a law enforcement representative; or logging information regarding the call to a log file or a database system; and/or the like. In some cases, at least one of the alert, the e-mail message, the SMS message, the text message, or the telephone call, and/or the like, might comprise at least one of an option to block access to the account by the at least one party, an option to change account credentials associated with the account, an option to contact the account owner, or an option to disconnect the call, based at least in part on a determination that the call is deemed by the at least one of the account owner, the account manager, the call center representative, or the law enforcement representative to be at least one of fraudulent use or unauthorized use of the telephone conferencing system or voice network, and/or the like.

According to some embodiments, the method might further comprise logging, with the computing system, information regarding the call to a log file or a database system; analyzing, with the computing system, the logged information to generate historical data associated with one or more of the at least one party, an account with the telephone conferencing system or voice network that is used by the at least one party to initiate the call, a conference bridge used by the at least one party to initiate the call, at least one destination party connected by the call, or at least one location associated with each party; determining, with the computing system, one or more weighted measures associated with each generated historical data; and generating, with the computing system, a score based on the historical data and the one or more weighted measures, the score being representative of a probability of fraudulent use or unauthorized use. In such embodiments, determining whether the call initiated by the at least one party constitutes at least one of fraudulent use or unauthorized use of the telephone conferencing system or voice network might comprise determining whether the call initiated by the at least one party constitutes at least one of fraudulent use or unauthorized use of the telephone conferencing system or voice network based at least in part on the generated score.

In some embodiments, the method might further comprise providing a trunking bridge between the at least one party and the telephone conferencing system or voice network, wherein the trunking bridge might comprise one of a public switched telephone network ("PSTN") trunking bridge, an integrated services digital network ("ISDN) trunking bridge, a voice over Internet protocol ("VoIP") trunking bridge, or a session initiation protocol ("SIP") trunking bridge, and/or the like.

In another aspect, an apparatus might comprise at least one processor and a non-transitory computer readable medium communicatively coupled to the at least one processor. The non-transitory computer readable medium might have stored thereon computer software comprising a set of instructions that, when executed by the at least one processor, causes the apparatus to: monitor call activity through a telephone conferencing system or voice network; in response to detecting use of the telephone conferencing system or voice network by at least one party based on the monitored call activity, identify at least one of incoming call data or outgoing call data associated with a call initiated by the at least one party; analyze the identified at least one of incoming call data or outgoing call data to determine whether the call initiated by the at least one party constitutes at least one of fraudulent use or unauthorized use of the telephone conferencing system or voice network; and based on a determination that the call initiated by the at least one party constitutes at least one of fraudulent use or unauthorized use of the telephone conferencing system or voice network, initiate one or more first actions.

In some embodiments, the one or more first actions might comprise at least one of temporarily blocking a network trunk; escalating disablement of a network trunk; permanently blocking a network trunk; temporarily blocking an account with the telephone conferencing system; escalating disablement of an account with the telephone conferencing system; permanently blocking an account with the telephone conferencing system; blocking one or more features of an account with the telephone conferencing system; changing routing of the call to route through specialized equipment for monitoring or recording the call; changing routing of the call to route to a call center; changing routing of the call to route to a law enforcement facility; changing routing of the call to route to a message service; changing routing of the call to route to an interactive voice response ("IVR") system; changing routing of the call to terminate the call; sending an alert regarding the call to at least one of an account owner, an account manager, a call center representative, or a law enforcement representative; sending an e-mail message regarding the call to at least one of an account owner, an account manager, a call center representative, or a law enforcement representative; sending a short message service ("SMS") message regarding the call to at least one of an account owner, an account manager, a call center representative, or a law enforcement representative; sending a text message regarding the call to at least one of an account owner, an account manager, a call center representative, or a law enforcement representative; initiating a telephone call regarding the call to at least one of an account owner, an account manager, a call center representative, or a law enforcement representative; or logging information regarding the call to a log file or a database system; and/or the like.

According to some embodiments, the set of instructions, when executed by the at least one processor, might further cause the apparatus to: log information regarding the call to a log file or a database system; analyze the logged information to generate historical data associated with one or more of the at least one party, an account with the telephone conferencing system or voice network that is used by the at least one party to initiate the call, a conference bridge used by the at least one party to initiate the call, at least one destination party connected by the call, or at least one location associated with each party; determine one or more weighted measures associated with each generated historical data; and generate a score based on the historical data and the one or more weighted measures, the score being representative of a probability of fraudulent use or unauthorized use. In such embodiments, determining whether the call initiated by the at least one party constitutes at least one of fraudulent use or unauthorized use of the telephone conferencing system or voice network might comprise determining whether the call initiated by the at least one party constitutes at least one of fraudulent use or unauthorized use of the telephone conferencing system or voice network based at least in part on the generated score.

In some embodiments, the set of instructions, when executed by the at least one processor, might further cause the apparatus to: provide a trunking bridge between the at least one party and the telephone conferencing system or voice network, wherein the trunking bridge might comprise one of a public switched telephone network ("PSTN") trunking bridge, an integrated services digital network ("ISDN) trunking bridge, a voice over Internet protocol ("VoIP") trunking bridge, or a session initiation protocol ("SIP") trunking bridge, and/or the like. In such embodiments, the trunking bridge might facilitate monitoring call activity and initiation of the one or more first actions.

In yet another aspect, a system might comprise a computing system, which might comprise at least one first processor and a first non-transitory computer readable medium communicatively coupled to the at least one first processor. The first non-transitory computer readable medium might have stored thereon computer software comprising a first set of instructions that, when executed by the at least one first processor, causes the computing system to: monitor call activity through a telephone conferencing system or voice network; in response to detecting use of the telephone conferencing system or voice network by at least one party based on the monitored call activity, identify at least one of incoming call data or outgoing call data associated with a call initiated by the at least one party; analyze the identified at least one of incoming call data or outgoing call data to determine whether the call initiated by the at least one party constitutes at least one of fraudulent use or unauthorized use of the telephone conferencing system or voice network; and based on a determination that the call initiated by the at least one party constitutes at least one of fraudulent use or unauthorized use of the telephone conferencing system or voice network, initiate one or more first actions.

Various modifications and additions can be made to the embodiments discussed without departing from the scope of the invention. For example, while the embodiments described above refer to particular features, the scope of this invention also includes embodiments having different combination of features and embodiments that do not include all of the above described features.

Specific Exemplary Embodiments

We now turn to the embodiments as illustrated by the drawings. FIGS. 1-6 illustrate some of the features of the method, system, and apparatus for implementing monitoring and detection of fraudulent or unauthorized use, and, more particularly, to methods, systems, and apparatuses for implementing monitoring and detection of fraudulent or unauthorized use in telephone conferencing systems or voice networks, as referred to above. The methods, systems, and apparatuses illustrated by FIGS. 1-6 refer to examples of different embodiments that include various components and steps, which can be considered alternatives or which can be used in conjunction with one another in the various embodiments. The description of the illustrated methods, systems, and apparatuses shown in FIGS. 1-6 is provided for purposes of illustration and should not be considered to limit the scope of the different embodiments.

With reference to the figures, FIG. 1 is a schematic diagram illustrating a system 100 for implementing monitoring and detection of fraudulent or unauthorized use in telephone conferencing systems or voice networks, in accordance with various embodiments.

In the non-limiting embodiment of FIG. 1, system 100 might comprise one or more calling devices 105 that are associated with or used by corresponding one or more originating parties 110 to initiate a conference call with one or more called devices 115 that are associated with or used by corresponding one or more destination parties 120*a*-120*n* (collectively, "destination parties 120" or the like) using a telephone conference system or voice network 125 over one or more networks 130*a*-130*n* (collectively, "networks 130" or the like). According to some embodiments, the conference call might be a call between two parties or among three or more parties over a conference platform, such as a conference bridge or the like provided by the telephone conference system or voice network 125, and may include, without limitation, a voice only conference call, a video conference call (with voice functionality), a voice over Internet protocol ("VoIP") conference call, a web-based or Internet based video conference call, and/or the like. The one or more calling devices 105 might include, but is not limited to, at least one of a telephone 105*a*, a smart phone 105*b*, a mobile phone 105*c*, a tablet computer (not shown), a laptop computer (not shown), a wearable device (not shown), or the like. Similarly, the one or more called devices might include, without limitation, at least one of a telephone 115*a*, a smart phone 115*b*, a mobile phone 115*c*, a tablet computer (not shown), a laptop computer (not shown), a wearable device (not shown), or the like.

In some cases, the one or more networks 130 might each include a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network(s) 130 might include an access network of the service provider (e.g., an Internet service provider ("ISP")). In another embodiment, the network(s) 130 might include a core network of the service provider, and/or the Internet.

In some embodiments, system 100 might further comprise computing system 135*a* and corresponding database(s) 140*a* as well as computing system 135*b* and corresponding database(s) 140*b*. Computing system 135*a* and corresponding database(s) 140*a* might be disposed external to telephone conference system or voice network 125, while computing system 135*b* and corresponding database(s) 140*b* might be disposed within telephone conference system or voice network 125. System 100 might further comprise one or more conference bridges 145*a*-145*n* (collectively, "conference bridges 145" or the like), one or more logging systems 150*a* (optional), and one or more artificial intelligence ("AI") systems 155 (optional), each of which may be disposed within telephone conference system or voice network 125. System 100 might further comprise one or more logging systems 150*b* (optional) that may be disposed external to telephone conference system or voice network 125, in some cases, disposed within a first network 130*a*, or the like. System 100 might further comprise one or more user devices 160 associated with corresponding one or more account owners or account managers 165, one or more call centers 170 (or call center representatives or user devices associated with or used by call center representatives), and one or more law enforcement facilities 175 (or law enforcement representatives or user devices associated with or used by law enforcement representatives), or the like. Herein, although some components of system 100 are indicated as being optional while others are not, this is merely for the particular embodiment as shown, and, in other embodiments, one or more of the former set of components (or components indicated as being "optional") may be required while one or more of the latter set of components (or components not indicated as being "optional") may in fact be optional.

In operation, computing system 135*a*, computing system 135*b*, or a monitoring system (such as monitoring system 380 of FIG. 3, or the like) (collectively, "computing system" or the like) might monitor call activity through telephone conferencing system or voice network 125. In response to detecting use of the telephone conferencing system or voice network 125 by at least one party (e.g., at least one of one or more originating parties 110 and/or one or more destination parties 120, or the like) based on the monitored call activity, the computing system might identify at least one of incoming call data or outgoing call data associated with a call initiated by the at least one party. The computing system might analyze the identified at least one of incoming call data or outgoing call data to determine whether the call initiated by the at least one party constitutes at least one of fraudulent use or unauthorized use of the telephone conferencing system or voice network 125. Based on a determination that the call initiated by the at least one party constitutes at least one of fraudulent use or unauthorized use of the telephone conferencing system or voice network, the computing system might initiate one or more first actions.

In some embodiments, the incoming call data might include, without limitation, at least one of conference identification information associated with a conference bridge, timestamp of call origination by each call-in party to the conference bridge, origination telephone number associated with each call-in party, geographic location information associated with each call-in party, or line identifier (e.g., network line, conference line, media resource line, or the like) corresponding to connection between each call-in party and the conference bridge, and/or the like. In some cases, the outgoing call data might include, but is not limited to, at least one of conference identification information associated with a conference bridge, timestamp of call origination by each call-out party from the conference bridge, destination telephone number associated with each destination party called by each call-out party, geographic location information associated with each call-out party, line identifier (e.g., network line, conference line, media resource line, or the like) corresponding to connection between each destination party and the conference bridge, or telephone number associated with each call-out party, and/or the like. In some instances, the call might be initiated by web control by the at least one parties, and the identified at least one of incoming call data or outgoing call data might include, without limitation, at least one of conference identification information associated with a conference bridge, timestamp of call origination by each call-in party to the conference bridge, timestamp of call origination by each call-out party from the conference bridge, geographic location information associated with each call-in party, geographic location information associated with each call-out party, Internet protocol ("IP") address associated with each call-in party, IP address associated with each call-out party, or WebSocket connection information, and/or the like.

According to some embodiments, identifying the at least one of the incoming call data or the outgoing call data associated with a call initiated by the at least one party might comprise obtaining the at least one of the incoming call data or the outgoing call data by at least one of scraping an application log file associated with the telephone conferencing system or voice network (not shown), using an application programming interface ("API") between the computing system and the telephone conferencing system or voice network 125 (not shown), or using a tracking service (not shown), and/or the like.

Merely by way of example, in some instances, determining whether the call initiated by the at least one party constitutes at least one of fraudulent use or unauthorized use of the telephone conferencing system or voice network might comprise comparing the identified at least one of incoming call data or outgoing call data with metadata, wherein the metadata might include, without limitation, at least one of account identifier associated with a user account with the telephone conferencing system or voice network, a telephone number associated with an account owner associated with the user account, geographic information associated with the account owner, or contact information associated with the account owner, and/or the like.

Alternatively, or additionally, determining whether the call initiated by the at least one party constitutes at least one of fraudulent use or unauthorized use of the telephone conferencing system or voice network might comprise determining that the at least one party is an unauthorized user who is using a user account with the telephone conferencing system or voice network for personal use or to sell to unsuspecting end-users, by at least one of determining that a personal identification number ("PIN") or leader code associated with the user account has been incorrectly entered more than a predetermined number of times (e.g., 5 times or 6 times, or the like; which is likely indicative of "PIN scanning" by an offending party trying to guess at the PIN or leader code after having already identified a valid account, or the like), determining that an origination telephone number associated with the at least one party does not match a telephone number associated with an account owner associated with the user account, determining that the at least one party is calling from a location that is different from geographic location associated with the account owner, determining that the at least one party is calling from a location that has a known propensity for initiating fraudulent calls, or determining that at least one of one or more destination parties is located in a foreign country, and/or the like. Any or all of these determinations may result in the call being flagged for further investigation by the computing system or by a person(s) alerted by the computing system.

Alternatively, or additionally, determining whether the call initiated by the at least one party constitutes at least one of fraudulent use or unauthorized use of the telephone conferencing system or voice network might comprise one of determining that the at least one party is using the telephone conferencing system or voice network as a bulk call generator, determining that the at least one party is using the telephone conferencing system or voice network as an originator of robocalls, or determining that the at least one party is using the telephone conferencing system or voice network as part of a denial of service ("DoS") attack, and/or the like, by at least one of determining that a number of out-dials from a single user account with the telephone conferencing system or voice network exceeds a predetermined threshold number of calls within a predetermined period, determining that the at least one party is calling from a location that has a known propensity for initiating fraudulent calls, determining that the at least one party is located in a foreign country, or determining that at least one of one or more destination parties is located in a foreign country, and/or the like. Any or all of these determinations may result in the call being flagged for further investigation by the computing system or by a person(s) alerted by the computing system. For example, if the number of times of dial-out or call-out exceeds a threshold amount (e.g., 20 times in one day, for instance, although not limited to such an amount), the system might flag the activity for further investigation by the computing system or by the person(s) alerted by the computing system. A more sensitive threshold amount may be set for activity that is focused on a single destination number or single destination party, or the like.

Alternatively, or additionally, determining whether the call initiated by the at least one party constitutes at least one of fraudulent use or unauthorized use of the telephone conferencing system or voice network might comprise determining that the at least one party is attempting to hide its identity or to hide direct communications by the at least one party, by at least one of determining that an origination telephone number associated with the at least one party does not match a telephone number associated with an account owner associated with the user account or determining that the at least one party is calling from a location that is different from geographic location associated with the account owner, or the like.

Alternatively, or additionally, determining whether the call initiated by the at least one party constitutes at least one of fraudulent use or unauthorized use of the telephone conferencing system or voice network might comprise determining that the at least one party is attempting to bypass long distance charges, by at least one of determining that an origination telephone number associated with the at least one party does not match a telephone number associated with an account owner associated with the user account, determining that the at least one party is calling from a location that is different from geographic location associated with the account owner, or determining that the call would be subject to long distance charges if initiated without using the telephone conferencing system, and/or the like.

Alternatively, or additionally, determining whether the call initiated by the at least one party constitutes at least one of fraudulent use or unauthorized use of the telephone conferencing system or voice network might comprise utilizing at least one of an artificial intelligence ("AI") system or a machine learning system, and/or the like, to determine whether the call initiated by the at least one party constitutes at least one of fraudulent use or unauthorized use of the telephone conferencing system or voice network.

In some embodiments, the one or more first actions might include, but is not limited to, at least one of temporarily blocking a network trunk; escalating disablement of a network trunk; permanently blocking a network trunk; temporarily blocking an account with the telephone conferencing system; escalating disablement of an account with the telephone conferencing system; permanently blocking an account with the telephone conferencing system; blocking one or more features of an account with the telephone conferencing system; changing routing of the call to route through specialized equipment for monitoring or recording the call; changing routing of the call to route to a call center; changing routing of the call to route to a law enforcement facility; changing routing of the call to route to a message service; changing routing of the call to route to an interactive voice response ("IVR") system; changing routing of the call to terminate the call; sending an alert regarding the call to at least one of an account owner, an account manager, a call center representative, or a law enforcement representative (e.g., to user device(s) 160 associated with account owner or manager(s) 165, to call center(s) 170, to law enforcement facility 175, and/or the like); sending an e-mail message regarding the call to at least one of an account owner, an account manager, a call center representative, or a law enforcement representative (e.g., to user device(s) 160 associated with account owner or manager(s) 165, to call center(s) 170, to law enforcement facility 175, and/or the like); sending a short message service ("SMS") message regarding the call to at least one of an account owner, an account manager, a call center representative, or a law enforcement representative (e.g., to user device(s) 160 associated with account owner or manager(s) 165, to call center(s) 170, to law enforcement facility 175, and/or the like); sending a text message regarding the call to at least one of an account owner, an account manager, a call center representative, or a law enforcement representative (e.g., to user device(s) 160 associated with account owner or manager(s) 165, to call center(s) 170, to law enforcement facility 175, and/or the like); initiating a telephone call regarding the call to at least one of an account owner, an account manager, a call center representative, or a law enforcement representative (e.g., to user device(s) 160 associated with account owner or manager(s) 165, to call center(s) 170, to law enforcement facility 175, and/or the like); or logging information regarding the call to a log file or a database system; and/or the like.

In some cases, at least one of the alert, the e-mail message, the SMS message, the text message, or the telephone call, and/or the like, might comprise at least one of an option to block access to the account by the at least one party, an option to change account credentials associated with the account, an option to contact the account owner, or an option to disconnect the call, based at least in part on a determination that the call is deemed by the at least one of the account owner, the account manager, the call center representative, or the law enforcement representative to be at least one of fraudulent use or unauthorized use of the telephone conferencing system or voice network, and/or the like. In some instances, blocking an entire network (whether temporarily, in an escalated manner, or permanently) may be applicable if a significant amount of fraudulent or unauthorized use is detected on the network trunk (e.g., more than 100 such uses per day, or more, for instance, although not limited to such amount). In some cases, if activity is isolated to a particular user account with the telephone conference system or voice network, the account may be disabled (whether temporarily, in an escalated manner, or permanently) or credentials changed to prevent future fraudulent or unauthorized usage. In some instances, if activity is isolated to particular features of a user's account (e.g., dial-out permission), that account may be modified to lock out or revoke that feature to prevent future unauthorized usage, or the like. In some cases, the logged information can be used for reporting, alarming, investigating, learning, and/or even predicting future fraudulent usage (perhaps in conjunction with use of the AI system(s) 155 or the like). In some embodiments, by tracking the last time that an account was used, it is possible for the computing system to raise the sensitivity of monitoring parameters if a conference bridge is used for the first time after a long period of non-use. By tracking if an account has definitely been affected by fraudulent or unauthorized use, additional measures may be taken to alert the account owner or account manager 165 of current activity on his, her, or their account.

According to some embodiments, alternative or additional to the operations described above, the computing system might log information regarding the call to a log file or a database system (e.g., database(s) 140*a*, database(s) 140*b*, logging system(s) 150*a*, logging system(s) 150*b*, and/or the like). The computing system might analyze the logged information to generate historical data associated with one or more of the at least one party, an account with the telephone conferencing system or voice network that is used by the at least one party to initiate the call, a conference bridge used by the at least one originating party 110 to initiate the call, at least one destination party 120 connected by the call, or at least one location associated with each party, and/or the like. The computing system might determine one or more weighted measures associated with each generated historical data, and might generate a score based on the historical data and the one or more weighted measures, the score being representative of a probability or likelihood of fraudulent use or unauthorized use. In such embodiments, determining whether the call initiated by the at least one party constitutes at least one of fraudulent use or unauthorized use of the telephone conferencing system or voice network might comprise determining whether the call initiated by the at least one party constitutes at least one of fraudulent use or unauthorized use of the telephone conferencing system or voice network based at least in part on the generated score.

In the various embodiments, the activity data that is monitored, tracked, or logged might include real-time data that gives pertinent information about activity in the telephone conference system or voice network 125. Such data might include, without limitation, conference data (including, but not limited to, conference identifier, timestamp, event start, event end, initiator information (e.g., phone session initiated, VoIP session initiated, web session initiated, first participant has arrived, last participant has left, chairperson or leader has arrived, chairperson or leader has left, etc.), and/or the like), audio line data (including, but not limited to, conference identifier, line identifier (e.g., network line, conference line, media resource line, or the like), far-end number (e.g., outbound—dialed number, inbound—caller ID, etc.), direction of call, initiator (e.g., inbound call, outbound call (originated via DTMF), outbound call—web session initiated (API), outbound call—initiated by operator, etc.), and/or the like), or web data (including, but not limited to, conference identifier, timestamp, source IP address, event type (e.g., connection established, session disconnected, conference start, conference end, outbound dial, disconnect line, etc.), and/or the like), and/or the like.

Figure 3:
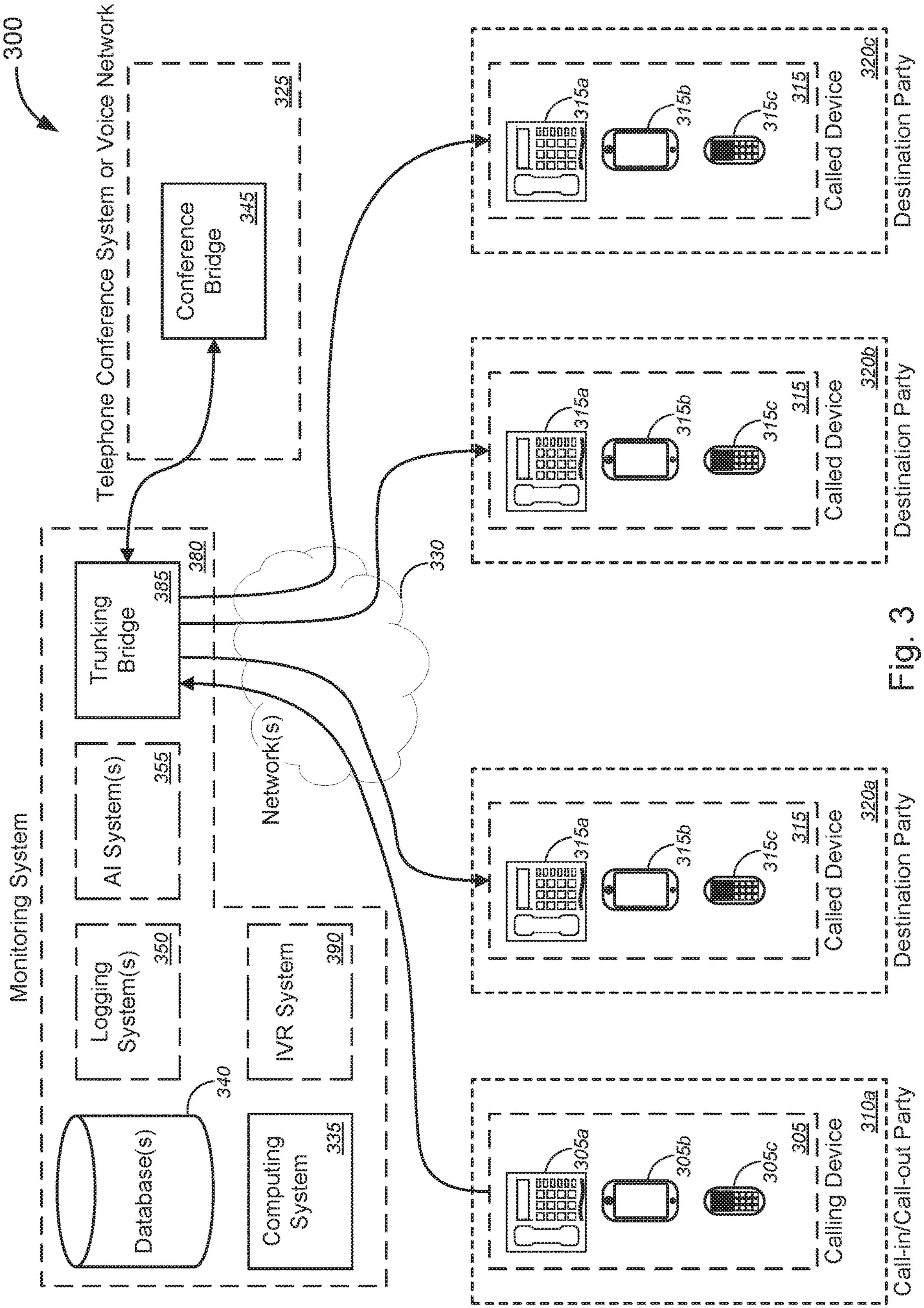
FIG. 3 is a schematic diagram illustrating a non-limiting example of use of a trunking bridge for a telephone conference system or voice network for which fraudulent or unauthorized use monitoring and detection may be implemented, in accordance with various embodiments.

In some embodiments, a trunking bridge might be provided between the at least one party and the telephone conferencing system or voice network (as shown in the non-limiting embodiment of FIG. 3, or the like). In such embodiments, the trunking bridge might include, without limitation, one of a public switched telephone network ("PSTN") trunking bridge, an integrated services digital network ("ISDN) trunking bridge, a voice over Internet protocol ("VoIP") trunking bridge, or a session initiation protocol ("SIP") trunking bridge, and/or the like. The use of the trunking bridge may facilitate monitoring call activity and/or initiation of the actions listed above.

These and other functions of the system 100 (and its components) are described in greater detail below with respect to FIGS. 2-4.

Figure 2A:
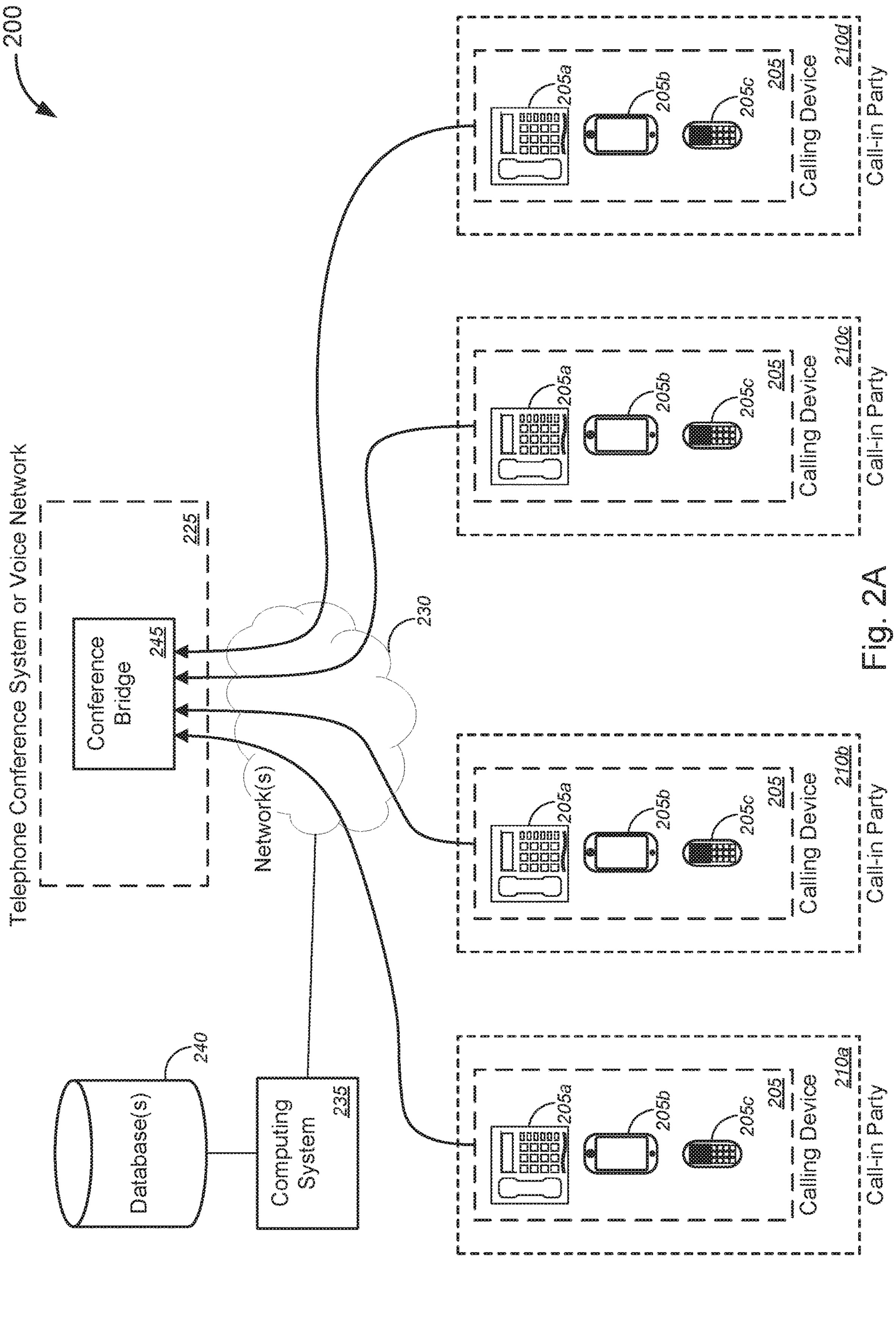
FIGS. 2A-2C are schematic diagrams illustrating various non-limiting examples of configurations for telephone conferencing for which fraudulent or unauthorized use monitoring and detection may be implemented, in accordance with various embodiments.
Figure 2B:
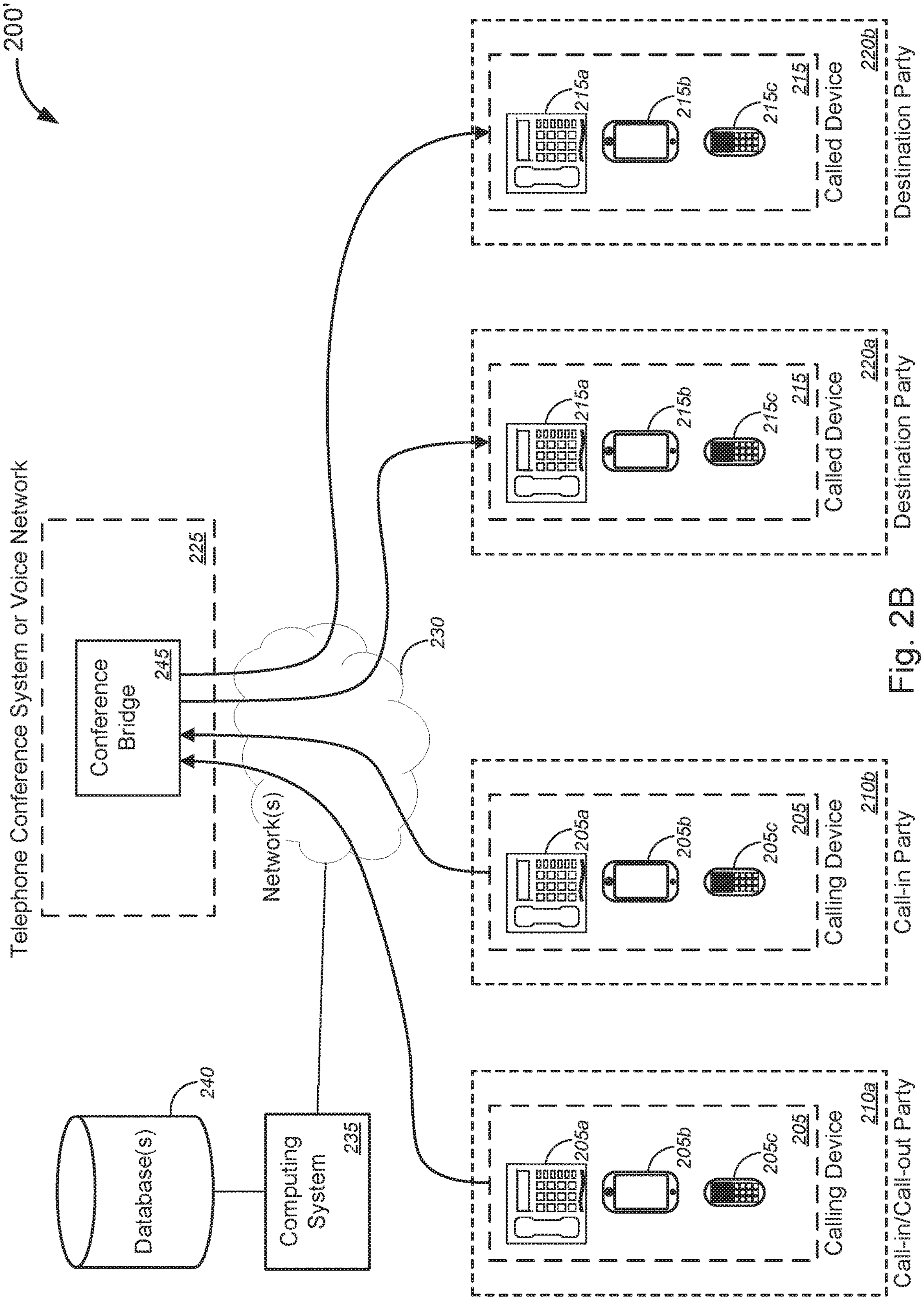
Figure 2C:
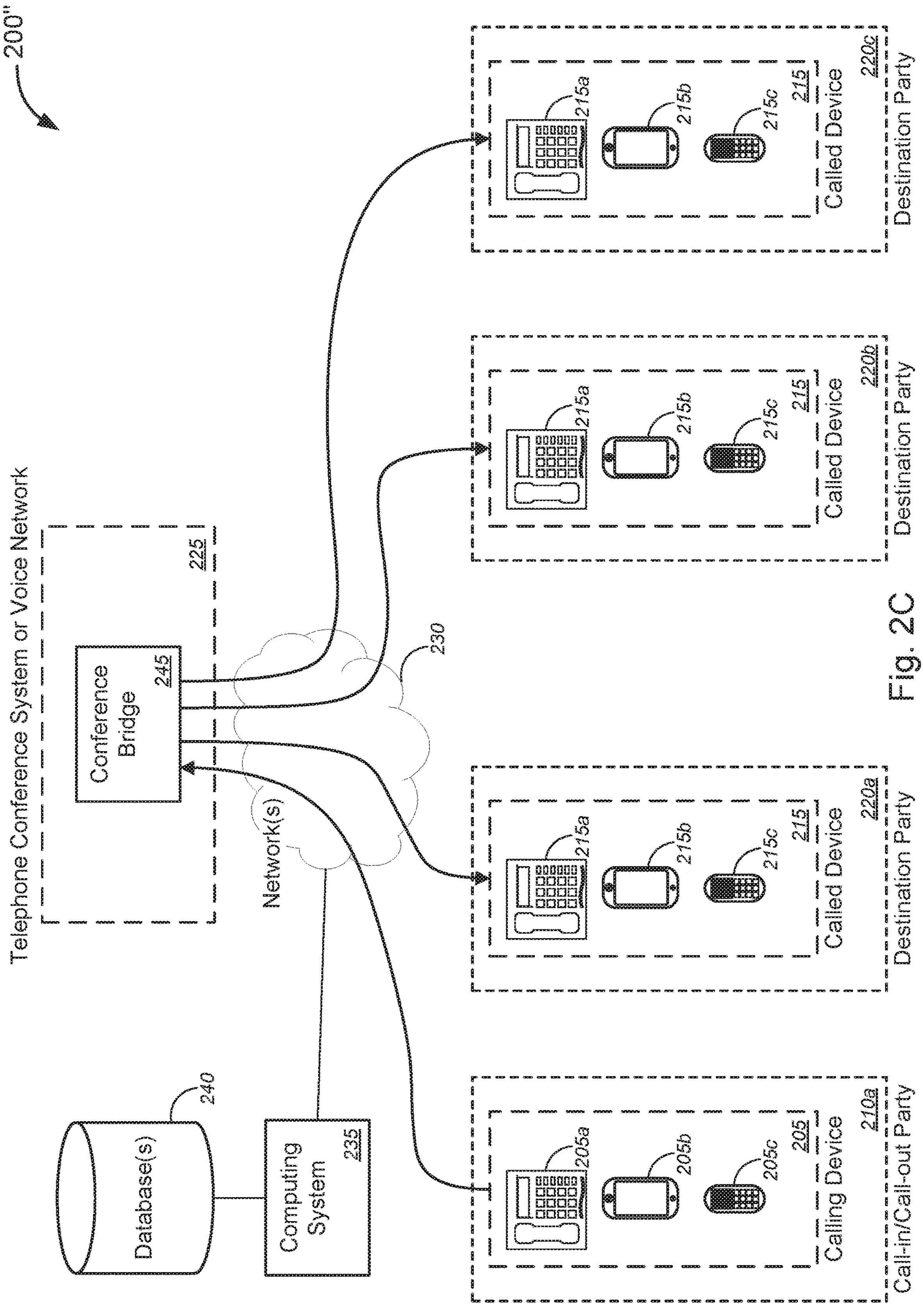

FIGS. 2A-2C (collectively, "FIG. 2") are schematic diagrams illustrating various non-limiting examples 200, 200', or 200" of configurations for telephone conferencing for which fraudulent or unauthorized use monitoring and detection may be implemented, in accordance with various embodiments. FIG. 2A depicts an example 200 in which all parties call into a conference bridge of a telephone conference system or voice network, while FIG. 2B depicts an example 200' in which more than one party calls into a conference bridge of a telephone conference system or voice network and one of the call-in parties calls out to one or more destination parties from the conference bridge, and FIG. 2C depicts an example 200" in which only one party calls into a conference bridge of a telephone conference system or voice network and calls out to one or more destination parties from the conference bridge. Although the examples of FIGS. 2A-2C may represent legitimate uses of the telephone conference system or voice network, these examples may also represent configurations in which fraudulent or unauthorized use of the telephone conference system or voice network may arise.

With reference to FIG. 2A, an example 200 of a configuration for telephone conferencing might comprise two or more calling device 205 (each including, but not limited to, at least one of a telephone 205*a*, a smart phone 205*b*, a mobile phone 205*c*, a tablet computer (not shown), a laptop computer (not shown), a wearable device (not shown), or the like) that are associated with or used by corresponding one or more call-in parties 210*a*-210*d* (collectively, "call-in parties 210" or the like) to initiate, or participate in, a conference call using telephone conference system or voice network 225 via one or more networks 230 (similar to network(s) 130 of FIG. 1, or the like). In particular, each call-in party 210*a*-210*d* might dial into or call into a conference bridge 245 provided by the telephone conference system or voice network 225 using a corresponding calling device 205 (as depicted in FIG. 2A by the arrows pointing from each calling device 215 to the conference bridge 245 through network(s) 230). A computing system 235 (and corresponding database(s) 240) might monitor the call activities of the call-in parties 210*a*-210*d* using the telephone conference system or voice network 225 by monitoring the network(s) 230 and tracking call connections between each calling device 205 associated with corresponding call-in party 210*a*-210*d* and the conference bridge 245. This example configuration 200 is subject to, or susceptible to, fraudulent or unauthorized use of the telephone conference system or voice network 225 when one of the call-in parties 210 or a third party (not shown) provides dial-in details (e.g., conference access number, conference access code, and/or conference chairperson or leader code or personal identification number ("PIN"), or the like) to the other call-in parties 210 while suggesting or promising that the other call-in parties 210 can avoid long distance or other telephone charges, or while trying to convince (or deceive) the other call-in parties 210 that they are purchasing or using "pre-paid" conference services or "pre-paid" calling cards, when the one of the call-in parties 210 or the third party is not authorized to provide the other call-in parties 210 with access to use to the telephone conference system or voice network 225. This example configuration 200 is also (or alternatively) subject to, or susceptible to, fraudulent or unauthorized use of the telephone conference system or voice network 225 when one or more of the call-in parties 210*a* -210*d* use the conference bridge 245 or the telephone conference system or voice network 225 to try to obfuscate or hide their identity or to add a layer of indirection in an attempt to slow or confuse monitoring systems (e.g., law enforcement or other entities) especially when using an account with the telephone conference system or voice network 225 that is not owned by any of them.

Turning to FIG. 2B, an example 200' of a configuration for telephone conferencing might comprise two or more calling device 205 (each including, but not limited to, at least one of a telephone 205*a*, a smart phone 205*b*, a mobile phone 205*c*, a tablet computer (not shown), a laptop computer (not shown), a wearable device (not shown), or the like) that are associated with or used by corresponding one or more call-in parties 210*a*-210*b* (collectively, "call-in parties 210" or the like) to initiate, or participate in, a conference call using telephone conference system or voice network 225 via one or more networks 230 (similar to network(s) 130 of FIG. 1, or the like). At least one of the call-in parties 210 (in this case, call-in party 210*a*) might also call-out from the telephone conference system or voice network 225, via network(s) 230, to one or more called devices 215 (each including, but not limited to, at least one of a telephone 215*a*, a smart phone 215*b*, a mobile phone 215*c*, a tablet computer (not shown), a laptop computer (not shown), a wearable device (not shown), or the like) that are associated with or used by corresponding one or more destination parties 220*a*-220*b* (collectively, "destination parties 220" or the like). In particular, each call-in party 210 might dial into or call into a conference bridge 245 provided by the telephone conference system or voice network 225 using a corresponding calling device 205, while at least one call-in party 210 might also call-out to each called device 215 associated with or used by each corresponding destination party 220*a*-220*b* (as depicted in FIG. 2B by the arrows pointing from each calling device 215 to the conference bridge 245 through network(s) 230 and the arrows pointing from the conference bridge 245 through network(s) 230 to each called device 215). A computing system 235 (and corresponding database(s) 240) might monitor the call activities of the call-in parties 210*a*-210*b* and the destination parties 220*a*-220*b* using the telephone conference system or voice network 225 by monitoring the network(s) 230 and tracking call connections between each calling device 205 associated with corresponding call-in party 210*a*-210*b* and the conference bridge 245 and between the conference bridge 245 and each called device 215 associated with corresponding destination party 220*a*-220*b*.

This example configuration 200' is subject to, or susceptible to, fraudulent or unauthorized use of the telephone conference system or voice network 225 when one of the call-in parties 210 or a third party (not shown) provides dial-in details (e.g., conference access number, conference access code, and/or conference chairperson or leader code or personal identification number ("PIN"), or the like) to the other call-in parties 210 while suggesting or promising that the other call-in parties 210 can avoid long distance or other telephone charges, or while trying to convince (or deceive) the other call-in parties 210 that they are purchasing or using "pre-paid" conference services or "pre-paid" calling cards, when the one of the call-in parties 210 or the third party is not authorized to provide the other call-in parties 210 with access to use to the telephone conference system or voice network 225. This example configuration 200' is also (or alternatively) subject to, or susceptible to, fraudulent or unauthorized use of the telephone conference system or voice network 225 when one of the call-in parties 210 or a third party (not shown) suggests or promises that another call-in party 210 can avoid long distance or other telephone charges when calling out to one or more destination parties

220, or while trying to convince (or deceive) the other call-in parties 210 that they are purchasing or using "pre-paid" conference services or "pre-paid" calling cards, or the like. This example configuration 200' is also (or alternatively) subject to, or susceptible to, fraudulent or unauthorized use of the telephone conference system or voice network 225 when one or more of the call-in parties 210 and/or the destination parties 220 use the conference bridge 245 or the telephone conference system or voice network 225 to try to obfuscate or hide their identity or to add a layer of indirection in an attempt to slow or confuse monitoring systems (e.g., law enforcement or other entities) especially when using an account with the telephone conference system or voice network 225 that is not owned by any of them.

Referring to FIG. 2C, an example 200" of a configuration for telephone conferencing might comprise only one calling device 205 (each including, but not limited to, at least one of a telephone 205*a*, a smart phone 205*b*, a mobile phone 205*c*, a tablet computer (not shown), a laptop computer (not shown), a wearable device (not shown), or the like) that is associated with or used by a corresponding call-in party 210 to initiate, or participate in, a conference call using telephone conference system or voice network 225 via one or more networks 230 (similar to network(s) 130 of FIG. 1, or the like). The one or single call-in party 210 (in this case, call-in party 210*a*) might also call-out from the telephone conference system or voice network 225, via network(s) 230, to one or more called devices 215 (each including, but not limited to, at least one of a telephone 215*a*, a smart phone 215*b*, a mobile phone 215*c*, a tablet computer (not shown), a laptop computer (not shown), a wearable device (not shown), or the like) that are associated with or used by corresponding one or more destination parties 220*a*-220*c* (collectively, "destination parties 220" or the like). In particular, the single call-in party 210*a* might dial into or call into a conference bridge 245 provided by the telephone conference system or voice network 225 using a corresponding calling device 205, while also calling out to each called device 215 associated with or used by each corresponding destination party 220*a*-220*c* (as depicted in FIG. 2C by the arrow pointing from the calling device 215 of call-in party 210*a* to the conference bridge 245 through network(s) 230 and the arrows pointing from the conference bridge 245 through network(s) 230 to each called device 215). A computing system 235 (and corresponding database(s) 240) might monitor the call activities of the call-in party 210*a* and the destination parties 220*a*-220*c* using the telephone conference system or voice network 225 by monitoring the network(s) 230 and tracking call connections between calling device 205 associated with corresponding call-in party 210*a* and the conference bridge 245 and between the conference bridge 245 and each called device 215 associated with corresponding destination party 220*a*-220*c*.

This example configuration 200" is subject to, or susceptible to, fraudulent or unauthorized use of the telephone conference system or voice network 225 when a third party (not shown) provides dial-in details (e.g., conference access number, conference access code, and/or conference chairperson or leader code or personal identification number ("PIN"), or the like) to the single call-in party 210*a* while suggesting or promising that the call-in party 210*a* can avoid long distance or other telephone charges, or while trying to convince (or deceive) the call-in party 210*a* that he, she, or they are purchasing or using "pre-paid" conference services or "pre-paid" calling cards, when the third party is not authorized to provide the call-in party 210*a* with access to use to the telephone conference system or voice network 225. This example configuration 200" is also (or alternatively) subject to, or susceptible to, fraudulent or unauthorized use of the telephone conference system or voice network 225 when the single call-in party 210*a*: (a) uses the conference bridge 245 or the telephone conference system or voice network 225 as his, her, or their personal toll-free telephone system or conference system; (b) uses the conference bridge 245 or the telephone conference system or voice network 225 to try to obfuscate or hide his, her, or their identity or to add a layer of indirection in an attempt to slow or confuse monitoring systems (e.g., law enforcement or other entities) especially when using an account with the telephone conference system or voice network 225 that is not owned by him, her, or them; (c) uses the conference bridge 245 or the telephone conference system or voice network 225 to make bulk calls or robocalls; (d) uses the conference bridge 245 or the telephone conference system or voice network 225 as part of a denial of service ("DoS") attack; or (e) uses the conference bridge 245 or the telephone conference system or voice network 225 to make long-distance to avoid paying long-distance charges or other telephone charges.

The calling devices 205, the call-in parties 210, the called devices 215, the destination parties 220, the telephone conference system or voice network 225, the network(s) 230, the computing system 235, the database(s) 240, and the conference bridge 245 of FIGS. 2A-2C are otherwise similar, if not identical, to the calling devices 105, the originating parties 110, the called devices 115, the destination parties 120, the telephone conference system or voice network 125, the network(s) 130*a*-130*n*, the computing system 135*a* or 135*b*, the database(s) 140*a* or 140*b*, and the conference bridges 145*a*-145*n* of FIG. 1, and the descriptions of these components of the telephone conference configurations shown in FIGS. 2A-2C are applicable to the corresponding components of system 100, respectively.

FIG. 3 is a schematic diagram illustrating a non-limiting example 300 of use of a trunking bridge for a telephone conference system or voice network for which fraudulent or unauthorized use monitoring and detection may be implemented, in accordance with various embodiments. Although FIG. 3 depicts a telephone conference configuration that is similar to that of example 200" of FIG. 2C, the various embodiments are not so limited and the use of the trunking bridge (as shown in FIG. 3) may be applicable to the telephone conference configuration example 200 of FIG. 2A, the telephone conference configuration example 200' of FIG. 2B, or other telephone conference configuration examples (not shown), or the like.

In the non-limiting embodiment of FIG. 3, an example 300 of a configuration for monitoring telephone conferencing might comprise a single calling device 305 (each including, but not limited to, at least one of a telephone 305*a*, a smart phone 305*b*, a mobile phone 305*c*, a tablet computer (not shown), a laptop computer (not shown), a wearable device (not shown), or the like) that is associated with or used by a corresponding call-in party 310 to initiate, or participate in, a conference call using telephone conference system or voice network 325 via one or more networks 330 (similar to network(s) 130 of FIG. 1, or the like). As indicated above, the various embodiments of the telephone conference monitoring are not limited to a telephone conference configuration in which a single calling device 305 or single call-in party 310 calling into the telephone conference system or voice network, and may be applicable to more than one calling device 305 or call-in party 310 calling into the telephone conference system or voice network. The single call-in party 310 (in this case, call-in party 310*a*) might also call-out from the telephone conference system or voice network 325, via network(s) 330, to one or more called devices 315 (each including, but not limited to, at least one of a telephone 315*a*, a smart phone 315*b*, a mobile phone 315*c*, a tablet computer (not shown), a laptop computer (not shown), a wearable device (not shown), or the like) that are associated with or used by corresponding one or more destination parties 320*a*-220*c* (collectively, "destination parties 320" or the like). In particular, the single call-in party 310*a* might dial into or call into a conference bridge 345 provided by the telephone conference system or voice network 325 using a corresponding calling device 305, while also calling out to each called device 315 associated with or used by each corresponding destination party 320*a*-220*c*.

Compared with the configurations as shown is FIGS. 1 and 2A-2C, a monitoring system 380 might be disposed between each calling device 305 or called device 315 and the conference bridge 345 or telephone conference system or voice network 325. Specifically, a trunking bridge 385 of the monitoring system 380 might be disposed between each calling device 305 or called device 315 and the conference bridge 345 or telephone conference system or voice network 325, where all incoming calls to the conference bridge 345 or telephone conference system or voice network 325 are first received by the trunking bridge 385, which then relays the incoming calls to the conference bridge 345 or telephone conference system or voice network 325, and where all outgoing calls from the conference bridge 345 or telephone conference system or voice network 325 are first received by the trunking bridge 385, which then relays the outgoing calls to the called devices 315 associate with or used by each destination party 320*a*-320*c* (as depicted in FIG. 3 by the arrow pointing from the calling device 315 of call-in party 310*a* to the trunking bridge 385 of monitoring system 380 through network(s) 330, and the arrows pointing from the trunking bridge 385 through network(s) 330 to each called device 315, with a double-headed arrow pointing between the trunking bridge 385 and the conference bridge 345). In some embodiments, the trunking bridge 385 might include, without limitation, one of a public switched telephone network ("PSTN") trunking bridge, an integrated services digital network ("ISDN) trunking bridge, a voice over Internet protocol ("VoIP") trunking bridge, or a session initiation protocol ("SIP") trunking bridge, and/or the like.

According to some embodiments, the monitoring system 380 might further comprise computing system 335 and corresponding database(s) 340, one or more logging systems 350 (optional), one or more artificial intelligence ("AI") systems 355 (optional), and an interactive voice response ("IVR") system 390 (optional), or the like, in addition to the trunking bridge 385. Herein, although some components of monitoring system 380 are indicated as being optional while others are not, this is merely for the particular embodiment as shown, and, in other embodiments, one or more of the former set of components (or components indicated as being "optional") may be required while one or more of the latter set of components (or components not indicated as being "optional") may in fact be optional.

The computing system 335 (in some cases, in conjunction with use of the AI systems 355) might monitor the call activities of the call-in party 310*a* and the destination parties 320*a*-220*c* using the telephone conference system or voice network 325 by monitoring the network(s) 330 and tracking call connections through the trunking bridge 385 between calling device 305 associated with corresponding call-in party 310*a* and the conference bridge 345 and between the conference bridge 345 and each called device 315 associated with corresponding destination party 320*a*-220*c*. The call activity monitored by the computing system 335 through the trunking bridge 385 either might be stored in database(s) 340 and/or might be logged by logging system(s) 350. In some cases, actions initiated by computing system 335, in response to determining that fraudulent or unauthorized use of the telephone conference system or voice network 325 has been detected, might include routing one or more offending parties 310 or 320 to IVR system 390 to obtain additional information regarding the offending parties and/or to confirm fraudulent or unauthorized use of the telephone conference system or voice network 325 by the one or more offending parties.

Other actions initiated by computing system 335, in response to determining that fraudulent or unauthorized use of the telephone conference system or voice network 325 has been detected, might, but are not limited to, at least one of temporarily blocking a network trunk; escalating disablement of a network trunk; permanently blocking a network trunk; temporarily blocking an account with the telephone conferencing system; escalating disablement of an account with the telephone conferencing system; permanently blocking an account with the telephone conferencing system; blocking one or more features of an account with the telephone conferencing system; changing routing of the call to route through specialized equipment for monitoring or recording the call; changing routing of the call to route to a call center; changing routing of the call to route to a law enforcement facility; changing routing of the call to route to a message service; changing routing of the call to terminate the call; sending an alert regarding the call to at least one of an account owner, an account manager, a call center representative, or a law enforcement representative; sending an e-mail message regarding the call to at least one of an account owner, an account manager, a call center representative, or a law enforcement representative; sending a short message service ("SMS") message regarding the call to at least one of an account owner, an account manager, a call center representative, or a law enforcement representative; sending a text message regarding the call to at least one of an account owner, an account manager, a call center representative, or a law enforcement representative; initiating a telephone call regarding the call to at least one of an account owner, an account manager, a call center representative, or a law enforcement representative; or logging information regarding the call to a log file or a database system (e.g., database 340 and/or logging system(s) 350, or the like); and/or the like. The use of the trunking bridge 385 may facilitate monitoring call activity and/or initiation of the actions listed above.

The calling device 305, the call-in party 310, the called devices 315, the destination parties 320, the telephone conference system or voice network 325, the network(s) 330, the computing system 335, the database(s) 340, the conference bridge 345, the one or more logging systems 350, and the AI systems 355 of FIG. 3 are otherwise similar, if not identical, to the calling devices 105, the originating parties 110, the called devices 115, the destination parties 120, the telephone conference system or voice network 125, the network(s) 130*a*-130*n*, the computing system 135*a* or 135*b*, the database(s) 140*a* or 140*b*, the conference bridges 145*a*-145*n*, the one or more logging systems 150, and the AI systems 155 of FIG. 1, and the descriptions of these components of the telephone conference configurations shown in FIG. 3 are applicable to the corresponding components of system 100, respectively.

FIGS. 4A-4E (collectively, "FIG. 4") are flow diagrams illustrating a method 400 for implementing monitoring and detection of fraudulent or unauthorized use in telephone conferencing systems or voice networks, in accordance with various embodiments.

While the techniques and procedures are depicted and/or described in a certain order for purposes of illustration, it should be appreciated that certain procedures may be reordered and/or omitted within the scope of various embodiments. Moreover, while the method 400 illustrated by FIG. 4 can be implemented by or with (and, in some cases, are described below with respect to) the systems, examples, or embodiments 100, 200, 200', 200", and 300 of FIGS. 1, 2A, 2B, 2C, and 3, respectively (or components thereof), such methods may also be implemented using any suitable hardware (or software) implementation. Similarly, while each of the systems, examples, or embodiments 100, 200, 200', 200", and 300 of FIGS. 1, 2A, 2B, 2C, and 3, respectively (or components thereof), can operate according to the method 400 illustrated by FIG. 4 (e.g., by executing instructions embodied on a computer readable medium), the systems, examples, or embodiments 100, 200, 200', 200", and 300 of FIGS. 1, 2A, 2B, 2C, and 3 can each also operate according to other modes of operation and/or perform other suitable procedures.

Figure 4A:
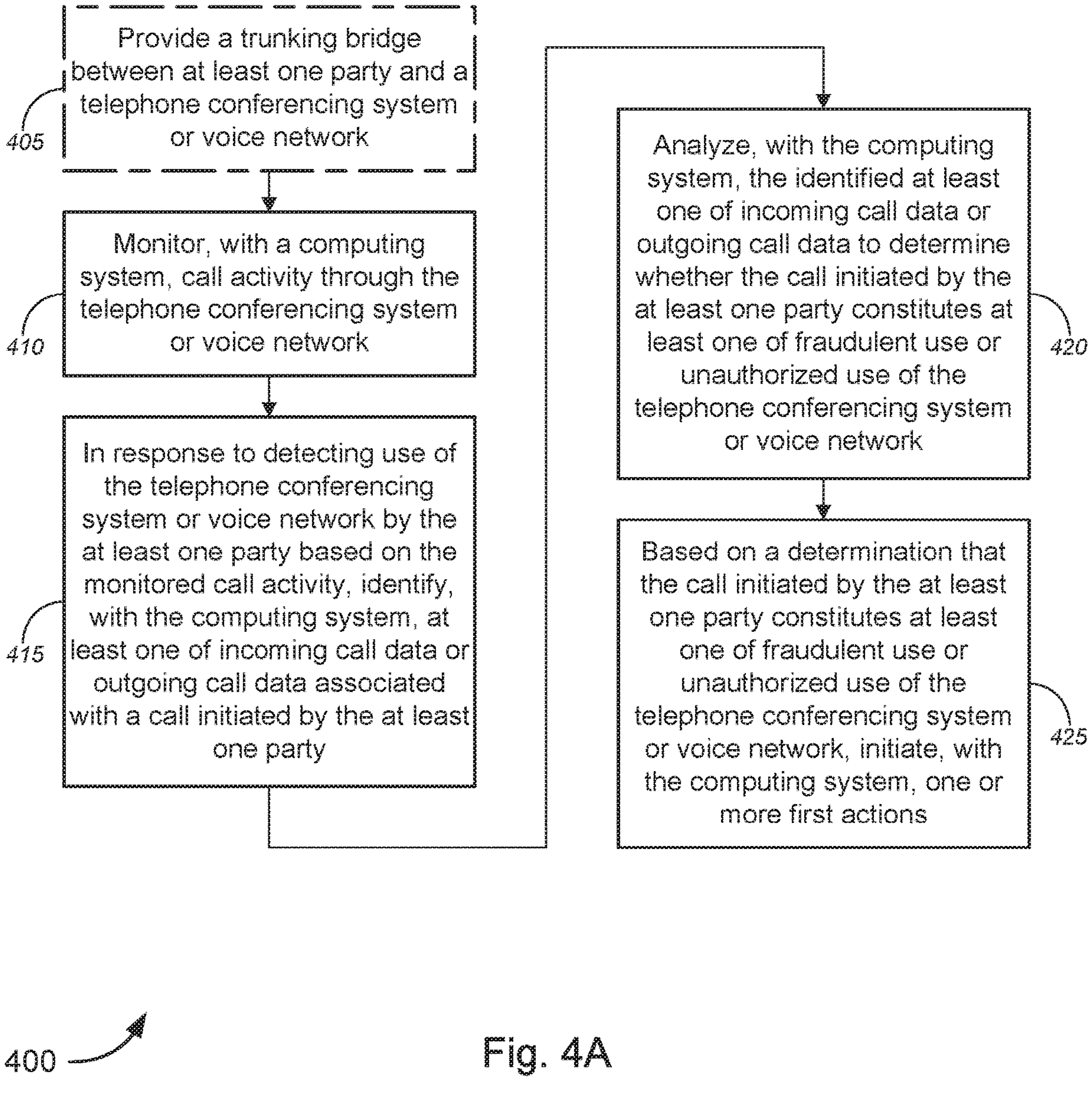

In the non-limiting embodiment of FIG. 4A, method 400, at optional block 405, might comprise providing a trunking bridge between at least one party and a telephone conferencing system or voice network. In some embodiments, the trunking bridge might include, without limitation, one of a public switched telephone network ("PSTN") trunking bridge, an integrated services digital network ("ISDN") trunking bridge, a voice over Internet protocol ("VoIP") trunking bridge, or a session initiation protocol ("SIP") trunking bridge, and/or the like.

At block 410, method 400 might comprise monitoring, with a computing system, call activity through the telephone conferencing system or voice network. Method 400 might further comprise, in response to detecting use of the telephone conferencing system or voice network by the at least one party based on the monitored call activity, identifying, with the computing system, at least one of incoming call data or outgoing call data associated with a call initiated by the at least one party (block 415).

Method 400 might further comprise, at block 420, analyzing, with the computing system, the identified at least one of incoming call data or outgoing call data to determine whether the call initiated by the at least one party constitutes at least one of fraudulent use or unauthorized use of the telephone conferencing system or voice network. Method 400, at block 425, might comprise, based on a determination that the call initiated by the at least one party constitutes at least one of fraudulent use or unauthorized use of the telephone conferencing system or voice network, initiating, with the computing system, one or more first actions. In some cases, the trunking bridge (as provided at block 405) might facilitate monitoring call activity (at block 410) and/or initiation of the one or more first actions (at block 425).

In some embodiments, the incoming call data might include, but is not limited to, at least one of conference identification information associated with a conference bridge, timestamp of call origination by each call-in party to the conference bridge, origination telephone number associated with each call-in party, geographic location information associated with each call-in party, or line identifier corresponding to connection between each call-in party and the conference bridge, and/or the like. In some cases, the outgoing call data might include, without limitation, at least one of conference identification information associated with a conference bridge, timestamp of call origination by each call-out party from the conference bridge, destination telephone number associated with each destination party called by each call-out party, geographic location information associated with each call-out party, line identifier corresponding to connection between each destination party and the conference bridge, or telephone number associated with each call-out party, and/or the like. In some instances, the call might be initiated by web control, and the identified at least one of incoming call data or outgoing call data might include, but is not limited to, at least one of conference identification information associated with a conference bridge, timestamp of call origination by each call-in party to the conference bridge, timestamp of call origination by each call-out party from the conference bridge, geographic location information associated with each call-in party, geographic location information associated with each call-out party, Internet protocol ("IP") address associated with each call-in party, IP address associated with each call-out party, or WebSocket connection information, and/or the like.

Figure 4B:
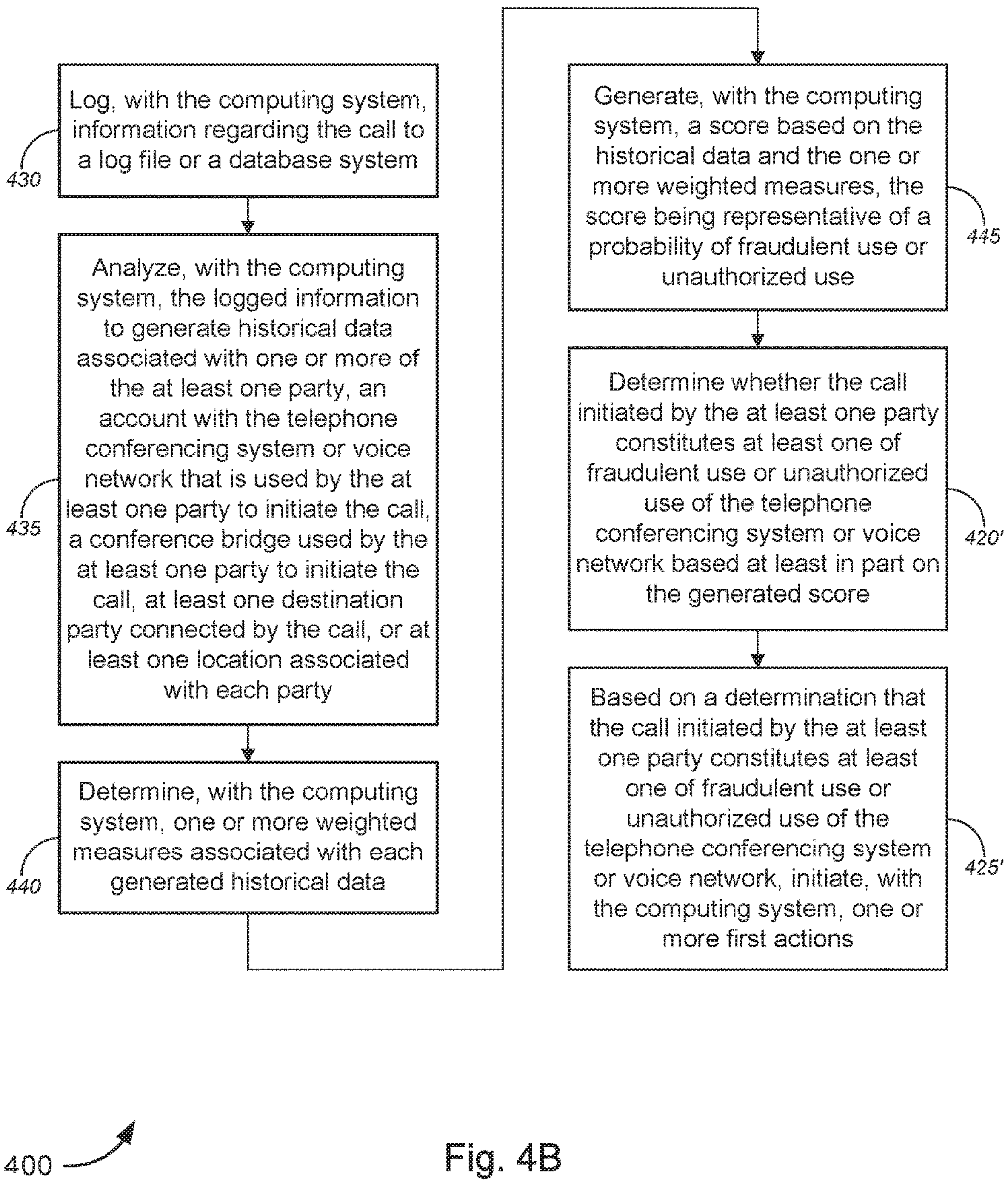

With reference to FIG. 4B, which provides an alternative or additional implementation, method 400 might further comprise, at block 430, logging, with the computing system, information regarding the call to a log file or a database system. At block 435, method 400 might comprise analyzing, with the computing system, the logged information to generate historical data associated with one or more of the at least one party, an account with the telephone conferencing system or voice network that is used by the at least one party to initiate the call, a conference bridge used by the at least one party to initiate the call, at least one destination party connected by the call, or at least one location associated with each party. Method 400, at block 440, might comprise determining, with the computing system, one or more weighted measures associated with each generated historical data. Method 400 might further comprise, at block 445, generating, with the computing system, a score based on the historical data and the one or more weighted measures, the score being representative of a probability of fraudulent use or unauthorized use. Method 400 might further comprise determining whether the call initiated by the at least one party constitutes at least one of fraudulent use or unauthorized use of the telephone conferencing system or voice network based at least in part on the generated score (block 420') and, based on a determination that the call initiated by the at least one party constitutes at least one of fraudulent use or unauthorized use of the telephone conferencing system or voice network, initiating, with the computing system, one or more first actions (block 425').

Turning to FIG. 4C, identifying the at least one of the incoming call data or the outgoing call data associated with a call initiated by the at least one party (at block 415) might comprise at least one of obtaining the at least one of the incoming call data or the outgoing call data by scraping an application log file associated with the telephone conferencing system or voice network (block 450), obtaining the at least one of the incoming call data or the outgoing call data by using an application programming interface ("API") between the computing system and the telephone conferencing system or voice network (block 455), or obtaining the at least one of the incoming call data or the outgoing call data using a tracking service (block 460), and/or the like.

Figure 4D:
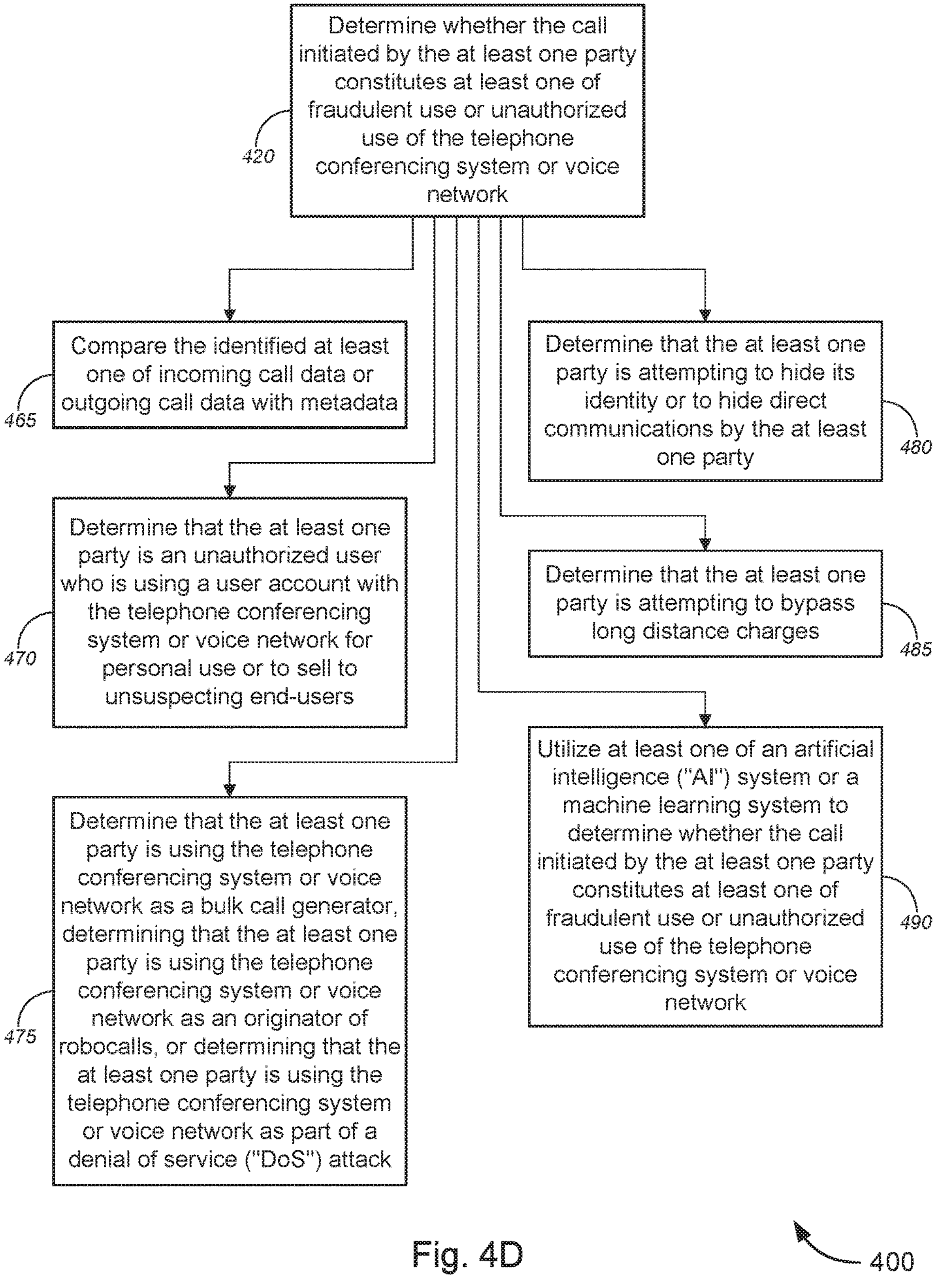

Referring to FIG. 4D, determining whether the call initiated by the at least one party constitutes at least one of fraudulent use or unauthorized use of the telephone conferencing system or voice network (at block 420 or 420') might comprise comparing the identified at least one of incoming call data or outgoing call data with metadata (block 465), where the metadata might include, without limitation, at least one of account identifier associated with a user account with the telephone conferencing system or voice network, a telephone number associated with an account owner associated with the user account, geographic information associated with the account owner, or contact information associated with the account owner, and/or the like. Alternatively, or additionally, determining whether the call initiated by the at least one party constitutes at least one of fraudulent use or unauthorized use of the telephone conferencing system or voice network (at block 420 or 420') might comprise determining that the at least one party is an unauthorized user who is using a user account with the telephone conferencing system or voice network for personal use or to sell to unsuspecting end-users (block 470), by at least one of determining that a personal identification number ("PIN") or leader code associated with the user account has been incorrectly entered more than a predetermined number of times, determining that an origination telephone number associated with the at least one party does not match a telephone number associated with an account owner associated with the user account, determining that the at least one party is calling from a location that is different from geographic location associated with the account owner, determining that the at least one party is calling from a location that has a known propensity for initiating fraudulent calls, or determining that at least one of one or more destination parties is located in a foreign country, and/or the like.

Alternatively, or additionally, determining whether the call initiated by the at least one party constitutes at least one of fraudulent use or unauthorized use of the telephone conferencing system or voice network (at block 420 or 420') might comprise determining that the at least one party is using the telephone conferencing system or voice network as a bulk call generator, determining that the at least one party is using the telephone conferencing system or voice network as an originator of robocalls, or determining that the at least one party is using the telephone conferencing system or voice network as part of a denial of service ("DoS") attack (block 475), by at least one of determining that a number of out-dials from a single user account with the telephone conferencing system or voice network exceeds a predetermined threshold number of calls within a predetermined period, determining that the at least one party is calling from a location that has a known propensity for initiating fraudulent calls, determining that the at least one party is located in a foreign country, or determining that at least one of one or more destination parties is located in a foreign country, and/or the like. Alternatively, or additionally, determining whether the call initiated by the at least one party constitutes at least one of fraudulent use or unauthorized use of the telephone conferencing system or voice network (at block 420 or 420') might comprise determining that the at least one party is attempting to hide its identity or to hide direct communications by the at least one party (block 480), by at least one of determining that an origination telephone number associated with the at least one party does not match a telephone number associated with an account owner associated with the user account or determining that the at least one party is calling from a location that is different from geographic location associated with the account owner, and/or the like.

Alternatively, or additionally, determining whether the call initiated by the at least one party constitutes at least one of fraudulent use or unauthorized use of the telephone conferencing system or voice network (at block 420 or 420') might comprise determining that the at least one party is attempting to bypass long distance charges (block 485), by at least one of determining that an origination telephone number associated with the at least one party does not match a telephone number associated with an account owner associated with the user account, determining that the at least one party is calling from a location that is different from geographic location associated with the account owner, or determining that the call would be subject to long distance charges if initiated without using the telephone conferencing system, and/or the like. Alternatively, or additionally, determining whether the call initiated by the at least one party constitutes at least one of fraudulent use or unauthorized use of the telephone conferencing system or voice network (at block 420 or 420') might comprise utilizing at least one of an artificial intelligence ("AI") system or a machine learning system to determine whether the call initiated by the at least one party constitutes at least one of fraudulent use or unauthorized use of the telephone conferencing system or voice network (block 490).

Figure 4E:
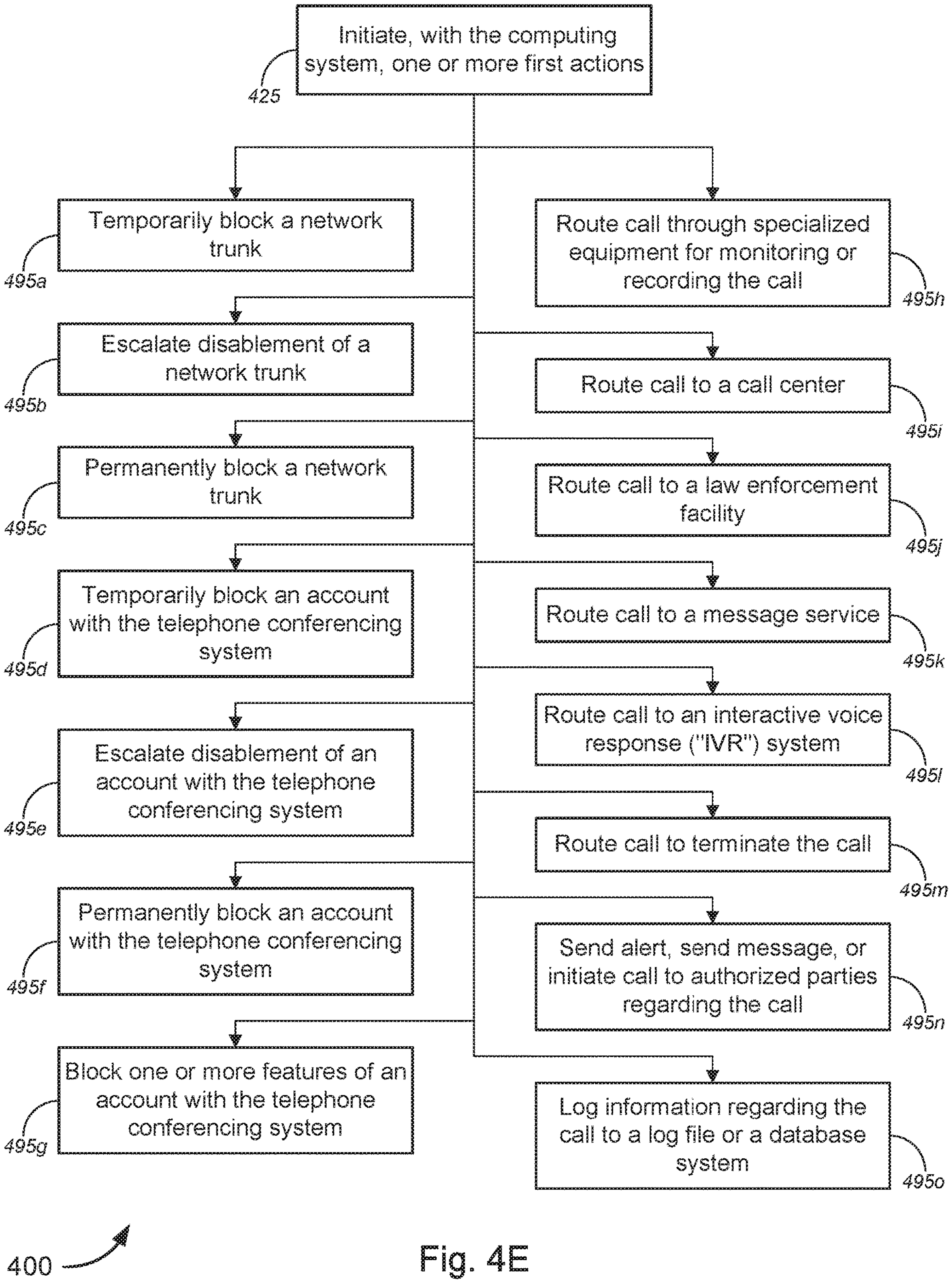

With reference to FIG. 4E, initiating, with the computing system, one or more first actions (at block 425) might comprise at least one of: temporarily blocking a network trunk (block 495*a*); escalating disablement of a network trunk (block 495*b*); permanently blocking a network trunk (block 495*c*); temporarily blocking an account with the telephone conferencing system (block 495*d*); escalating disablement of an account with the telephone conferencing system (block 495*e*); permanently blocking an account with the telephone conferencing system (block 495*f*); blocking one or more features of an account with the telephone conferencing system (block 495*g*); changing routing of the call to route through specialized equipment for monitoring or recording the call (block 495*h*); changing routing of the call to route to a call center (block 495*i*); changing routing of the call to route to a law enforcement facility (block 495*j*); changing routing of the call to route to a message service (block 495*k*); changing routing of the call to route to an interactive voice response ("IVR") system (block 495*l*); changing routing of the call to terminate the call (block 495*m*); sending alert(s), sending message(s), or initiating call(s) to authorized parties regarding the call (block 495*n*); or logging information regarding the call to a log file or a database system (block 495*o*); and/or the like.

In some cases, sending alert(s), sending message(s), or initiating call(s) to authorized parties regarding the call might comprise at least one of sending an alert regarding the call to at least one of an account owner, an account manager, a call center representative, or a law enforcement representative; sending an e-mail message regarding the call to at least one of an account owner, an account manager, a call center representative, or a law enforcement representative; sending a short message service ("SMS") message regarding the call to at least one of an account owner, an account manager, a call center representative, or a law enforcement representative; sending a text message regarding the call to at least one of an account owner, an account manager, a call center representative, or a law enforcement representative; initiating a telephone call regarding the call to at least one of an account owner, an account manager, a call center representative, or a law enforcement representative; and/or the like.

In some instances, at least one of the alert, the e-mail message, the SMS message, the text message, or the telephone call might comprise at least one of an option to block access to the account by the at least one party, an option to change account credentials associated with the account, an option to contact the account owner, or an option to disconnect the call, and/or the like, based at least in part on a determination that the call is deemed by the at least one of the account owner, the account manager, the call center representative, or the law enforcement representative to be at least one of fraudulent use or unauthorized use of the telephone conferencing system or voice network.

Exemplary System and Hardware Implementation

Figure 5:
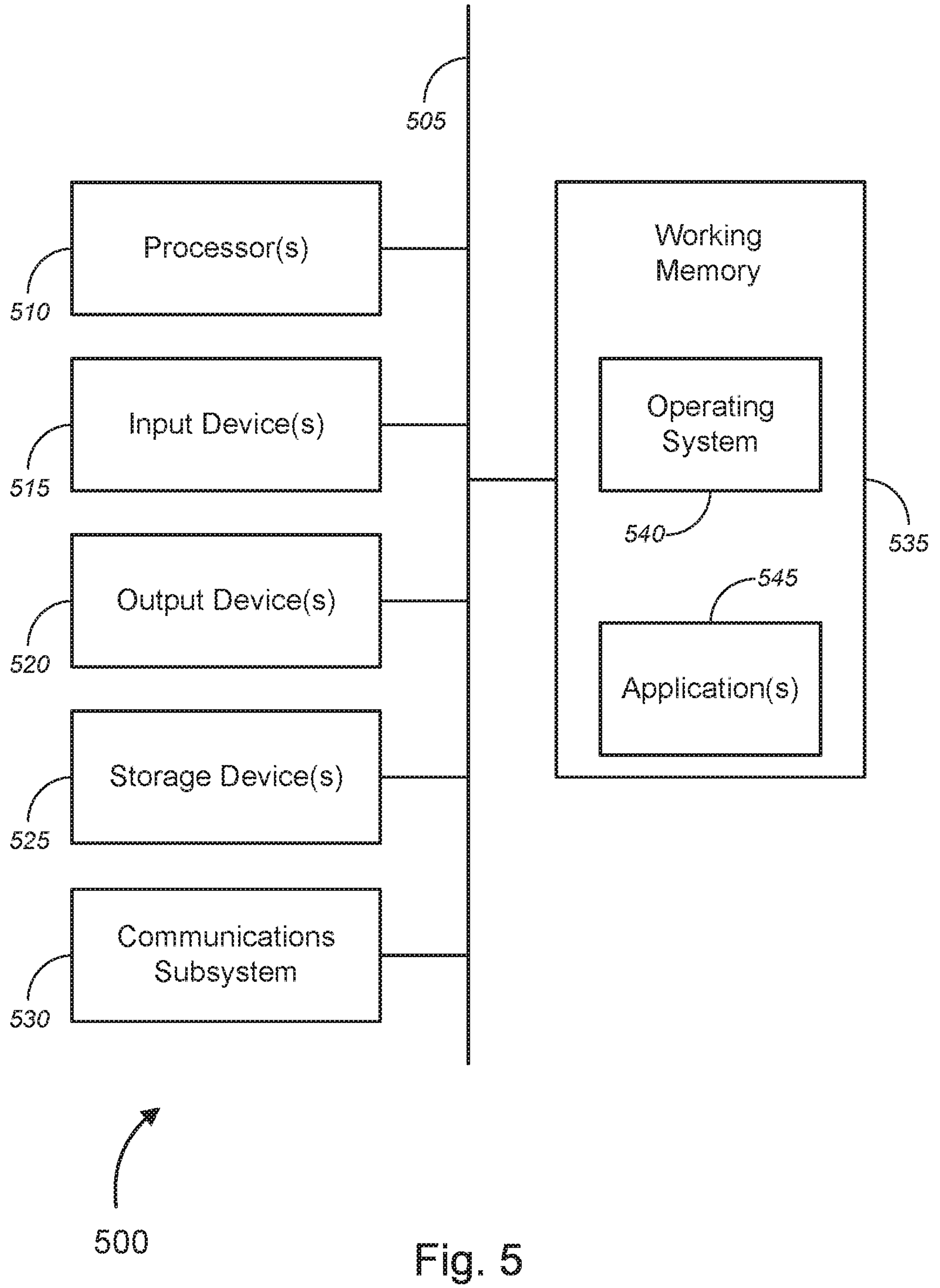
FIG. 5 is a block diagram illustrating an exemplary computer or system hardware architecture, in accordance with various embodiments.

FIG. 5 is a block diagram illustrating an exemplary computer or system hardware architecture, in accordance with various embodiments. FIG. 5 provides a schematic illustration of one embodiment of a computer system 500 of the service provider system hardware that can perform the methods provided by various other embodiments, as described herein, and/or can perform the functions of computer or hardware system (i.e., computing systems 135*a*, 135*b*, 235, and 335, logging systems 150*a*, 150*b*, and 350, artificial intelligence ("AI") systems 155 and 355, and interactive voice response ("IVR") system 390, etc.), as described above. It should be noted that FIG. 5 is meant only to provide a generalized illustration of various components, of which one or more (or none) of each may be utilized as appropriate. FIG. 5, therefore, broadly illustrates how individual system elements may be implemented in a relatively separated or relatively more integrated manner.

The computer or hardware system 500—which might represent an embodiment of the computer or hardware system (i.e., computing systems 135*a*, 135*b*, 235, and 335, logging systems 150*a*, 150*b*, and 350, AI systems 155 and 355, and IVR system 390, etc.), described above with respect to FIGS. 1-4—is shown comprising hardware elements that can be electrically coupled via a bus 505 (or may otherwise be in communication, as appropriate). The hardware elements may include one or more processors 510, including, without limitation, one or more general-purpose processors and/or one or more special-purpose processors (such as microprocessors, digital signal processing chips, graphics acceleration processors, and/or the like); one or more input devices 515, which can include, without limitation, a mouse, a keyboard, and/or the like; and one or more output devices 520, which can include, without limitation, a display device, a printer, and/or the like.

The computer or hardware system 500 may further include (and/or be in communication with) one or more storage devices 525, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer or hardware system 500 might also include a communications subsystem 530, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 530 may permit data to be exchanged with a network (such as the network described below, to name one example), with other computer or hardware systems, and/or with any other devices described herein. In many embodiments, the computer or hardware system 500 will further comprise a working memory 535, which can include a RAM or ROM device, as described above.

The computer or hardware system 500 also may comprise software elements, shown as being currently located within the working memory 535, including an operating system 540, device drivers, executable libraries, and/or other code, such as one or more application programs 545, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 525 described above. In some cases, the storage medium might be incorporated within a computer system, such as the system 500. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer or hardware system 500 and/or might take the form of source and/or installable code, which, upon compilation and/or installation on the computer or hardware system 500 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 500) to perform methods in accordance with various embodiments of the invention. According to a set of embodiments, some or all of the procedures of such methods are performed by the computer or hardware system 500 in response to processor 510 executing one or more sequences of one or more instructions (which might be incorporated into the operating system 540 and/or other code, such as an application program 545) contained in the working memory 535. Such instructions may be read into the working memory 535 from another computer readable medium, such as one or more of the storage device(s) 525. Merely by way of example, execution of the sequences of instructions contained in the working memory 535 might cause the processor(s) 510 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 500, various computer readable media might be involved in providing instructions/code to processor(s) 510 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 525. Volatile media includes, without limitation, dynamic memory, such as the working memory 535. In some alternative embodiments, a computer readable medium may take the form of transmission media, which includes, without limitation, coaxial cables, copper wire, and fiber optics, including the wires that comprise the bus 505, as well as the various components of the communication subsystem 530 (and/or the media by which the communications subsystem 530 provides communication with other devices). In an alternative set of embodiments, transmission media can also take the form of waves (including without limitation radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 500. These signals, which might be in the form of electromagnetic signals, acoustic signals, optical signals, and/or the like, are all examples of carrier waves on which instructions can be encoded, in accordance with various embodiments of the invention.

The communications subsystem 530 (and/or components thereof) generally will receive the signals, and the bus 505 then might carry the signals (and/or the data, instructions, etc. carried by the signals) to the working memory 535, from which the processor(s) 505 retrieves and executes the instructions. The instructions received by the working memory 535 may optionally be stored on a storage device 525 either before or after execution by the processor(s) 510.

Figure 6:
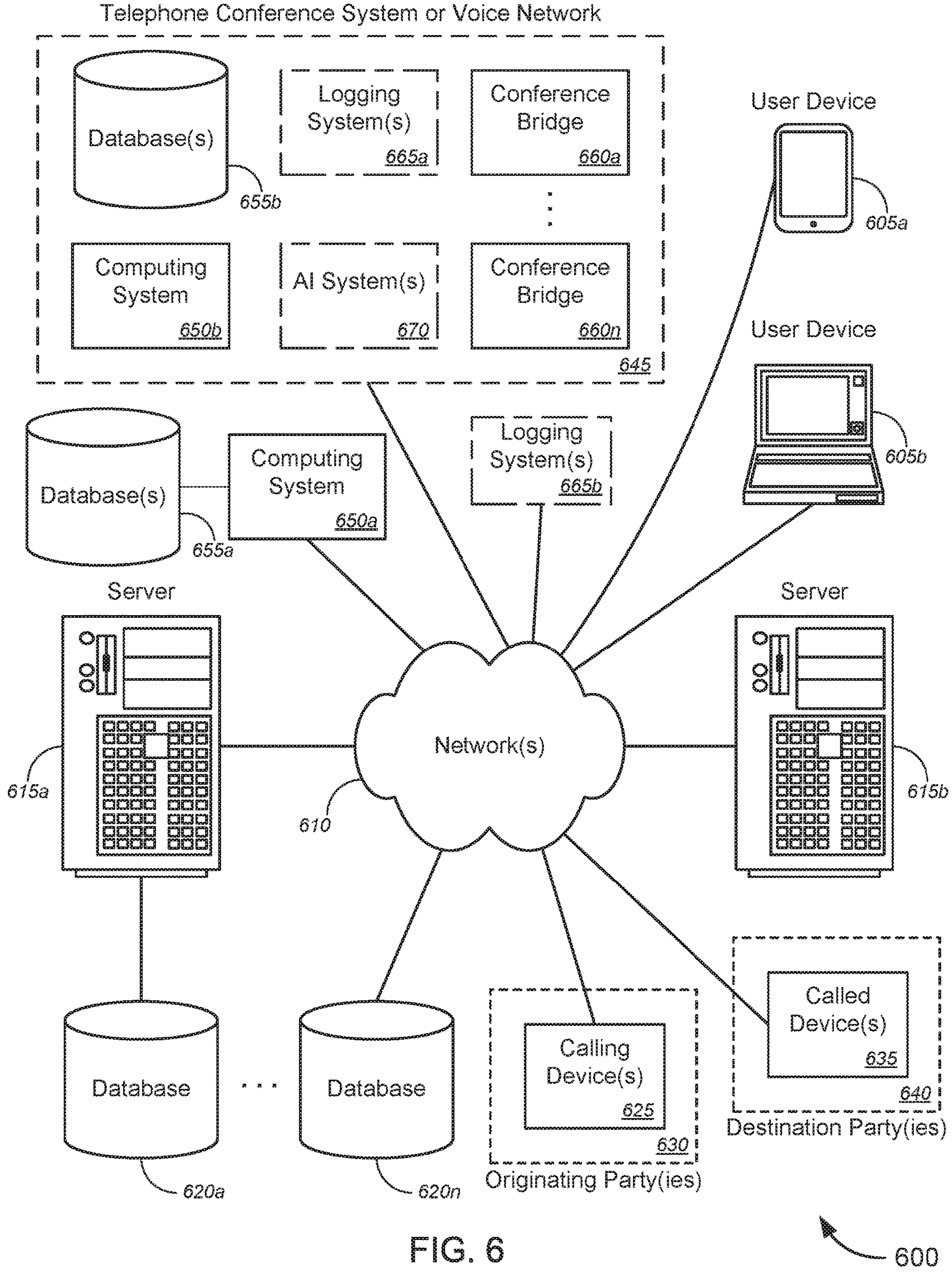
FIG. 6 is a block diagram illustrating a networked system of computers, computing systems, or system hardware architecture, which can be used in accordance with various embodiments.

As noted above, a set of embodiments comprises methods and systems for implementing monitoring and detection of fraudulent or unauthorized use, and, more particularly, to methods, systems, and apparatuses for implementing monitoring and detection of fraudulent or unauthorized use in telephone conferencing systems or voice networks. FIG. 6 illustrates a schematic diagram of a system 600 that can be used in accordance with one set of embodiments. The system 600 can include one or more user computers, user devices, or customer devices 605. A user computer, user device, or customer device 605 can be a general purpose personal computer (including, merely by way of example, desktop computers, tablet computers, laptop computers, handheld computers, and the like, running any appropriate operating system, several of which are available from vendors such as Apple, Microsoft Corp., and the like), cloud computing devices, a server(s), and/or a workstation computer(s) running any of a variety of commercially-available UNIX™ or UNIX-like operating systems. A user computer, user device, or customer device 605 can also have any of a variety of applications, including one or more applications configured to perform methods provided by various embodiments (as described above, for example), as well as one or more office applications, database client and/or server applications, and/or web browser applications. Alternatively, a user computer, user device, or customer device 605 can be any other electronic device, such as a thin-client computer, Internet-enabled mobile telephone, and/or personal digital assistant, capable of communicating via a network (e.g., the network(s) 610 described below) and/or of displaying and navigating web pages or other types of electronic documents. Although the exemplary system 600 is shown with two user computers, user devices, or customer devices 605, any number of user computers, user devices, or customer devices can be supported.

Certain embodiments operate in a networked environment, which can include a network(s) 610. The network(s) 610 can be any type of network familiar to those skilled in the art that can support data communications using any of a variety of commercially-available (and/or free or proprietary) protocols, including, without limitation, TCP/IP, SNA™, IPX™, AppleTalk™, and the like. Merely by way of example, the network(s) 610 (similar to networks 130*a*-130*n*, 230, and 330 of FIGS. 1-3, or the like) can each include a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 615. Each of the server computers 615 may be configured with an operating system, including, without limitation, any of those discussed above, as well as any commercially (or freely) available server operating systems. Each of the servers 615 may also be running one or more applications, which can be configured to provide services to one or more clients 605 and/or other servers 615.

Merely by way of example, one of the servers 615 might be a data server, a web server, a cloud computing device(s), or the like, as described above. The data server might include (or be in communication with) a web server, which can be used, merely by way of example, to process requests for web pages or other electronic documents from user computers 605. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 605 to perform methods of the invention.

The server computers 615, in some embodiments, might include one or more application servers, which can be configured with one or more applications accessible by a client running on one or more of the client computers 605 and/or other servers 615. Merely by way of example, the server(s) 615 can be one or more general purpose computers capable of executing programs or scripts in response to the user computers 605 and/or other servers 615, including, without limitation, web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™, and the like, which can process requests from clients (including, depending on the configuration, dedicated database clients, API clients, web browsers, etc.) running on a user computer, user device, or customer device 605 and/or another server 615. In some embodiments, an application server can perform one or more of the processes for implementing monitoring and detection of fraudulent or unauthorized use, and, more particularly, to methods, systems, and apparatuses for implementing monitoring and detection of fraudulent or unauthorized use in telephone conferencing systems or voice networks, as described in detail above. Data provided by an application server may be formatted as one or more web pages (comprising HTML, JavaScript, etc., for example) and/or may be forwarded to a user computer 605 via a web server (as described above, for example). Similarly, a web server might receive web page requests and/or input data from a user computer 605 and/or forward the web page requests and/or input data to an application server. In some cases, a web server may be integrated with an application server.

In accordance with further embodiments, one or more servers 615 can function as a file server and/or can include one or more of the files (e.g., application code, data files, etc.) necessary to implement various disclosed methods, incorporated by an application running on a user computer 605 and/or another server 615. Alternatively, as those skilled in the art will appreciate, a file server can include all necessary files, allowing such an application to be invoked remotely by a user computer, user device, or customer device 605 and/or server 615.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 620*a*-620*n* (collectively, "databases 620"). The location of each of the databases 620 is discretionary: merely by way of example, a database 620*a* might reside on a storage medium local to (and/or resident in) a server 615*a* (and/or a user computer, user device, or customer device 605). Alternatively, a database 620*n* can be remote from any or all of the computers 605, 615, so long as it can be in communication (e.g., via the network 610) with one or more of these. In a particular set of embodiments, a database 620 can reside in a storage-area network ("SAN") familiar to those skilled in the art. (Likewise, any necessary files for performing the functions attributed to the computers 605, 615 can be stored locally on the respective computer and/or remotely, as appropriate.) In one set of embodiments, the database 620 can be a relational database, such as an Oracle database, that is adapted to store, update, and retrieve data in response to SQL-formatted commands. The database might be controlled and/or maintained by a database server, as described above, for example.

According to some embodiments, system 600 might further comprise a calling device(s) 625 (similar to calling devices 105, 205, and 305 of FIGS. 1-3, or the like) associated with each of one or more corresponding originating parties 630 (similar to originating parties 110, call-in parties 210, or call-in/call-out parties 210 or 310 of FIGS. 1-3, or the like) and a called device(s) 635 (similar to called devices 115, 215, and 315 of FIGS. 1-3, or the like) associated with each of one or more corresponding destination parties 640 (similar to destination parties 120, 220, and 320 of FIGS. 1-3, or the like). System 600 might further comprise telephone conference system or voice network 645 (similar to telephone conference system or voice networks 125, 225, and 325 of FIGS. 1-3, or the like), computing system 650*a* and corresponding database(s) 655*a* (similar to computing systems 135*a*, 235, and 335 and corresponding database(s) 140*a*, 240, and 340 of FIGS. 1-3, or the like), computing system 650 and corresponding database(s) 655*b* (similar to computing system 135*b* and corresponding database(s) 140*b* of FIG. 1, or the like). Computing system 650*a* and corresponding database(s) 655*a* might be disposed external to telephone conference system or voice network 645, while computing system 650*b* and corresponding database(s) 655*b* might be disposed within telephone conference system or voice network 645. System 600 might further comprise one or more conference bridges 660*a*-660*n* (similar to conference bridges 145*a*-145*n*, 245, and 345 of FIGS. 1-3, or the like), one or more logging systems 665*a* (optional; similar to logging systems 150*a* and 350 of FIGS. 1 and 3, or the like), and one or more artificial intelligence ("AI") systems 670 (optional; similar to AI systems 155 and 355 of FIGS. 1 and 3, or the like), each of which may be disposed within telephone conference system or voice network 645. System 600 might further comprise one or more logging systems 665*b* (optional; similar to logging systems 150*b* and 350 of FIGS. 1 and 3, or the like) that may be disposed external to telephone conference system or voice network 645.

In operation, computing system 650*a*, computing system 650*b*, or a monitoring system (such as monitoring system 380 of FIG. 3, or the like) (collectively, "computing system" or the like) might monitor call activity through telephone conferencing system or voice network 645. In response to detecting use of the telephone conferencing system or voice network 645 by at least one party (e.g., at least one of one or more originating parties 630 and/or one or more destination parties 640, or the like) based on the monitored call activity, the computing system might identify at least one of incoming call data or outgoing call data associated with a call initiated by the at least one party. The computing system might analyze the identified at least one of incoming call data or outgoing call data to determine whether the call initiated by the at least one party constitutes at least one of fraudulent use or unauthorized use of the telephone conferencing system or voice network 645. Based on a determination that the call initiated by the at least one party constitutes at least one of fraudulent use or unauthorized use of the telephone conferencing system or voice network, the computing system might initiate one or more first actions.

In some embodiments, the incoming call data might include, without limitation, at least one of conference identification information associated with a conference bridge, timestamp of call origination by each call-in party to the conference bridge, origination telephone number associated with each call-in party, geographic location information associated with each call-in party, or line identifier (e.g., network line, conference line, media resource line, or the like) corresponding to connection between each call-in party and the conference bridge, and/or the like. In some cases, the outgoing call data might include, but is not limited to, at least one of conference identification information associated with a conference bridge, timestamp of call origination by each call-out party from the conference bridge, destination telephone number associated with each destination party called by each call-out party, geographic location information associated with each call-out party, line identifier (e.g., network line, conference line, media resource line, or the like) corresponding to connection between each destination party and the conference bridge, or telephone number associated with each call-out party, and/or the like. In some instances, the call might be initiated by web control by the at least one parties, and the identified at least one of incoming call data or outgoing call data might include, without limitation, at least one of conference identification information associated with a conference bridge, timestamp of call origination by each call-in party to the conference bridge, timestamp of call origination by each call-out party from the conference bridge, geographic location information associated with each call-in party, geographic location information associated with each call-out party, Internet protocol ("IP") address associated with each call-in party, IP address associated with each call-out party, or WebSocket connection information, and/or the like.

According to some embodiments, identifying the at least one of the incoming call data or the outgoing call data associated with a call initiated by the at least one party might comprise obtaining the at least one of the incoming call data or the outgoing call data by at least one of scraping an application log file associated with the telephone conferencing system or voice network (not shown), using an application programming interface ("API") between the computing system and the telephone conferencing system or voice network 645 (not shown), or using a tracking service (not shown), and/or the like.

Merely by way of example, in some instances, determining whether the call initiated by the at least one party constitutes at least one of fraudulent use or unauthorized use of the telephone conferencing system or voice network might comprise comparing the identified at least one of incoming call data or outgoing call data with metadata, wherein the metadata might include, without limitation, at least one of account identifier associated with a user account with the telephone conferencing system or voice network, a telephone number associated with an account owner associated with the user account, geographic information associated with the account owner, or contact information associated with the account owner, and/or the like.

Alternatively, or additionally, determining whether the call initiated by the at least one party constitutes at least one of fraudulent use or unauthorized use of the telephone conferencing system or voice network might comprise determining that the at least one party is an unauthorized user who is using a user account with the telephone conferencing system or voice network for personal use or to sell to unsuspecting end-users, by at least one of determining that a personal identification number ("PIN") or leader code associated with the user account has been incorrectly entered more than a predetermined number of times (e.g., 5 times or 6 times, or the like; which is likely indicative of "PIN scanning" by an offending party trying to guess at the PIN or leader code after having already identified a valid account, or the like), determining that an origination telephone number associated with the at least one party does not match a telephone number associated with an account owner associated with the user account, determining that the at least one party is calling from a location that is different from geographic location associated with the account owner, determining that the at least one party is calling from a location that has a known propensity for initiating fraudulent calls, or determining that at least one of one or more destination parties is located in a foreign country, and/or the like. Any or all of these determinations may result in the call being flagged for further investigation by the computing system or by a person(s) alerted by the computing system.

Alternatively, or additionally, determining whether the call initiated by the at least one party constitutes at least one of fraudulent use or unauthorized use of the telephone conferencing system or voice network might comprise one of determining that the at least one party is using the telephone conferencing system or voice network as a bulk call generator, determining that the at least one party is using the telephone conferencing system or voice network as an originator of robocalls, or determining that the at least one party is using the telephone conferencing system or voice network as part of a denial of service ("DoS") attack, and/or the like, by at least one of determining that a number of out-dials from a single user account with the telephone conferencing system or voice network exceeds a predetermined threshold number of calls within a predetermined period, determining that the at least one party is calling from a location that has a known propensity for initiating fraudulent calls, determining that the at least one party is located in a foreign country, or determining that at least one of one or more destination parties is located in a foreign country, and/or the like. Any or all of these determinations may result in the call being flagged for further investigation by the computing system or by a person(s) alerted by the computing system. For example, if the number of times of dial-out or call-out exceeds a threshold amount (e.g., 20 times in one day, for instance, although not limited to such an amount), the system might flag the activity for further investigation by the computing system or by the person(s) alerted by the computing system. A more sensitive threshold amount may be set for activity that is focused on a single destination number or single destination party, or the like.

Alternatively, or additionally, determining whether the call initiated by the at least one party constitutes at least one of fraudulent use or unauthorized use of the telephone conferencing system or voice network might comprise determining that the at least one party is attempting to hide its identity or to hide direct communications by the at least one party, by at least one of determining that an origination telephone number associated with the at least one party does not match a telephone number associated with an account owner associated with the user account or determining that the at least one party is calling from a location that is different from geographic location associated with the account owner, or the like.

Alternatively, or additionally, determining whether the call initiated by the at least one party constitutes at least one of fraudulent use or unauthorized use of the telephone conferencing system or voice network might comprise determining that the at least one party is attempting to bypass long distance charges, by at least one of determining that an origination telephone number associated with the at least one party does not match a telephone number associated with an account owner associated with the user account, determining that the at least one party is calling from a location that is different from geographic location associated with the account owner, or determining that the call would be subject to long distance charges if initiated without using the telephone conferencing system, and/or the like.

Alternatively, or additionally, determining whether the call initiated by the at least one party constitutes at least one of fraudulent use or unauthorized use of the telephone conferencing system or voice network might comprise utilizing at least one of an artificial intelligence ("AI") system or a machine learning system, and/or the like, to determine whether the call initiated by the at least one party constitutes at least one of fraudulent use or unauthorized use of the telephone conferencing system or voice network.

In some embodiments, the one or more first actions might include, but is not limited to, at least one of temporarily blocking a network trunk; escalating disablement of a network trunk; permanently blocking a network trunk; temporarily blocking an account with the telephone conferencing system; escalating disablement of an account with the telephone conferencing system; permanently blocking an account with the telephone conferencing system; blocking one or more features of an account with the telephone conferencing system; changing routing of the call to route through specialized equipment for monitoring or recording the call; changing routing of the call to route to a call center; changing routing of the call to route to a law enforcement facility; changing routing of the call to route to a message service; changing routing of the call to route to an interactive voice response ("IVR") system; changing routing of the call to terminate the call; sending an alert regarding the call to at least one of an account owner, an account manager, a call center representative, or a law enforcement representative (e.g., to user device 605*a* or 605*b* associated with the at least one of the account owner, the account manager, the call center representative, or the law enforcement representative, or the like); sending an e-mail message regarding the call to at least one of an account owner, an account manager, a call center representative, or a law enforcement representative (e.g., to user device 605*a* or 605*b* associated with the at least one of the account owner, the account manager, the call center representative, or the law enforcement representative, or the like); sending a short message service ("SMS") message regarding the call to at least one of an account owner, an account manager, a call center representative, or a law enforcement representative (e.g., to user device 605*a* or 605*b* associated with the at least one of the account owner, the account manager, the call center representative, or the law enforcement representative, or the like); sending a text message regarding the call to at least one of an account owner, an account manager, a call center representative, or a law enforcement representative (e.g., to user device 605*a* or 605*b* associated with the at least one of the account owner, the account manager, the call center representative, or the law enforcement representative, or the like); initiating a telephone call regarding the call to at least one of an account owner, an account manager, a call center representative, or a law enforcement representative (e.g., to user device 605*a* or 605*b* associated with the at least one of the account owner, the account manager, the call center representative, or the law enforcement representative, or the like); or logging information regarding the call to a log file or a database system; and/or the like.

In some cases, at least one of the alert, the e-mail message, the SMS message, the text message, or the telephone call, and/or the like, might comprise at least one of an option to block access to the account by the at least one party, an option to change account credentials associated with the account, an option to contact the account owner, or an option to disconnect the call, based at least in part on a determination that the call is deemed by the at least one of the account owner, the account manager, the call center representative, or the law enforcement representative to be at least one of fraudulent use or unauthorized use of the telephone conferencing system or voice network, and/or the like.

These and other functions of the system 600 (and its components) are described in greater detail above with respect to FIGS. 1-4.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:

monitoring, with a computing system, call activity through a telephone conferencing system or voice network;

in response to detecting use of the telephone conferencing system or voice network by at least one party based on the monitored call activity, identifying, with the computing system, at least one of incoming call data or outgoing call data associated with a call initiated by the at least one party;

analyzing, with the computing system, the identified at least one of incoming call data or outgoing call data to determine whether the call initiated by the at least one party constitutes at least one of fraudulent use or unauthorized use of the telephone conferencing system or voice network;

based on a determination that the call initiated by the at least one party constitutes at least one of fraudulent use or unauthorized use of the telephone conferencing system or voice network, initiating, with the computing system, one or more first actions;

logging, with the computing system, information regarding the call to a log file or a database system;

analyzing, with the computing system, the logged information to generate historical data associated with one or more of the at least one party, an account with the telephone conferencing system or voice network that is used by the at least one party to initiate the call, a conference bridge used by the at least one party to initiate the call, at least one destination party connected by the call, or at least one location associated with each party;

determining, with the computing system, one or more weighted measures associated with each generated historical data; and generating, with the computing system, a score based on the historical data and the one or more weighted measures, the score being representative of a probability of fraudulent use or unauthorized use, wherein determining whether the call initiated by the at least one party constitutes at least one of fraudulent use or unauthorized use of the telephone conferencing system or voice network comprises determining whether the call initiated by the at least one party constitutes at least one of fraudulent use or unauthorized use of the telephone conferencing system or voice network based at least in part on the generated score.

2. The method of claim 1, wherein the incoming call data comprises at least one of timestamp of call origination by each call-in party to the conference bridge, origination telephone number associated with each call-in party, or geographic location information associated with each call-in party.

3. The method of claim 1, wherein the outgoing call data comprises at least one of timestamp of call origination by each call-out party from the conference bridge, destination telephone number associated with each destination party called by each call-out party, geographic location information associated with each call-out party, line identifier corresponding to connection between each destination party and the conference bridge, or telephone number associated with each call-out party.

4. The method of claim 1, wherein the call is initiated by web control, wherein the identified at least one of incoming call data or outgoing call data comprises at least one of timestamp of call origination by each call-in party to the conference bridge, timestamp of call origination by each call-out party from the conference bridge, geographic location information associated with each call-in party, geographic location information associated with each call-out party, Internet protocol ("IP") address associated with each call-in party, IP address associated with each call-out party, or WebSocket connection information.

5. The method of claim 1, wherein identifying the at least one of the incoming call data or the outgoing call data associated with a call initiated by the at least one party comprises obtaining the at least one of the incoming call data or the outgoing call data by at least one of scraping an application log file associated with the telephone conferencing system or voice network, using an application programming interface ("API") between the computing system and the telephone conferencing system or voice network, or using a tracking service.

6. The method of claim 1, wherein determining whether the call initiated by the at least one party constitutes at least one of fraudulent use or unauthorized use of the telephone conferencing system or voice network comprises comparing, with the computing system, the identified at least one of incoming call data or outgoing call data with metadata, wherein the metadata comprises at least one of account identifier associated with a user account with the telephone conferencing system or voice network, a telephone number associated with an account owner associated with the user account, geographic information associated with the account owner, or contact information associated with the account owner.

7. The method of claim 1, wherein determining whether the call initiated by the at least one party constitutes at least one of fraudulent use or unauthorized use of the telephone conferencing system or voice network comprises determining that the at least one party is an unauthorized user who is using a user account with the telephone conferencing system or voice network for personal use or to sell to unsuspecting end-users, by at least one of determining that a personal identification number ("PIN") or leader code associated with the user account has been incorrectly entered more than a predetermined number of times, determining that an origination telephone number associated with the at least one party does not match a telephone number associated with an account owner associated with the user account, determining that the at least one party is calling from a location that is different from geographic location associated with the account owner, determining that the at least one party is calling from a location that has a known propensity for initiating fraudulent calls, or determining that at least one of one or more destination parties is located in a foreign country.

8. The method of claim 1, wherein determining whether the call initiated by the at least one party constitutes at least one of fraudulent use or unauthorized use of the telephone conferencing system or voice network comprises one of determining that the at least one party is using the telephone conferencing system or voice network as a bulk call generator, determining that the at least one party is using the telephone conferencing system or voice network as an originator of robocalls, or determining that the at least one party is using the telephone conferencing system or voice network as part of a denial of service ("DoS") attack, by at least one of determining that a number of out-dials from a single user account with the telephone conferencing system or voice network exceeds a predetermined threshold number of calls within a predetermined period, determining that the at least one party is calling from a location that has a known propensity for initiating fraudulent calls, determining that the at least one party is located in a foreign country, or determining that at least one of one or more destination parties is located in a foreign country.

9. The method of claim 1, wherein determining whether the call initiated by the at least one party constitutes at least one of fraudulent use or unauthorized use of the telephone conferencing system or voice network comprises determining that the at least one party is attempting to hide its identity or to hide direct communications by the at least one party, by at least one of determining that an origination telephone number associated with the at least one party does not match a telephone number associated with an account owner associated with the user account or determining that the at least one party is calling from a location that is different from geographic location associated with the account owner.

10. The method of claim 1, wherein determining whether the call initiated by the at least one party constitutes at least one of fraudulent use or unauthorized use of the telephone conferencing system or voice network comprises determining that the at least one party is attempting to bypass long distance charges, by at least one of determining that an origination telephone number associated with the at least one party does not match a telephone number associated with an account owner associated with the user account, determining that the at least one party is calling from a location that is different from geographic location associated with the account owner, or determining that the call would be subject to long distance charges if initiated without using the telephone conferencing system.

11. The method of claim 1, wherein determining whether the call initiated by the at least one party constitutes at least one of fraudulent use or unauthorized use of the telephone conferencing system or voice network comprises utilizing at least one of an artificial intelligence ("AI") system or a machine learning system to determine whether the call initiated by the at least one party constitutes at least one of fraudulent use or unauthorized use of the telephone conferencing system or voice network.

12. The method of claim 1, wherein the one or more first actions comprise at least one of temporarily blocking a network trunk; escalating disablement of a network trunk; permanently blocking a network trunk; temporarily blocking an account with the telephone conferencing system; escalating disablement of an account with the telephone conferencing system; permanently blocking an account with the telephone conferencing system; blocking one or more features of an account with the telephone conferencing system; changing routing of the call to route through specialized equipment for monitoring or recording the call; changing routing of the call to route to a call center; changing routing of the call to route to a law enforcement facility; changing routing of the call to route to a message service; changing routing of the call to route to an interactive voice response ("IVR") system; changing routing of the call to terminate the call; sending an alert regarding the call to at least one of an account owner, an account manager, a call center representative, or a law enforcement representative; sending an e-mail message regarding the call to at least one of an account owner, an account manager, a call center representative, or a law enforcement representative; sending a short message service ("SMS") message regarding the call to at least one of an account owner, an account manager, a call center representative, or a law enforcement representative; sending a text message regarding the call to at least one of an account owner, an account manager, a call center representative, or a law enforcement representative; initiating a telephone call regarding the call to at least one of an account owner, an account manager, a call center representative, or a law enforcement representative; or logging information regarding the call to a log file or a database system.

13. The method of claim 12, wherein at least one of the alert, the e-mail message, the SMS message, the text message, or the telephone call comprises at least one of an option to block access to the account by the at least one party, an option to change account credentials associated with the account, an option to contact the account owner, or an option to disconnect the call, based at least in part on a determination that the call is deemed by the at least one of the account owner, the account manager, the call center representative, or the law enforcement representative to be at least one of fraudulent use or unauthorized use of the telephone conferencing system or voice network.

14. The method of claim 1, further comprising:

providing a trunking bridge between the at least one party and the telephone conferencing system or voice network, wherein the trunking bridge comprises one of a public switched telephone network ("PSTN") trunking bridge, an integrated services digital network ("ISDN) trunking bridge, a voice over Internet protocol ("VoIP") trunking bridge, or a session initiation protocol ("SIP") trunking bridge;

wherein the trunking bridge facilitates monitoring call activity and initiation of the one or more first actions.

15. An apparatus, comprising:

at least one processor; and a non-transitory computer readable medium communicatively coupled to the at least one processor, the non-transitory computer readable medium having stored thereon computer software comprising a set of instructions that, when executed by the at least one processor, causes the apparatus to:

monitor call activity through a telephone conferencing system or voice network;

in response to detecting use of the telephone conferencing system or voice network by at least one party based on the monitored call activity, identify at least one of incoming call data or outgoing call data associated with a call initiated by the at least one party;

analyze the identified at least one of incoming call data or outgoing call data to determine whether the call initiated by the at least one party constitutes at least one of fraudulent use or unauthorized use of the telephone conferencing system or voice network;

based on a determination that the call initiated by the at least one party constitutes at least one of fraudulent use or unauthorized use of the telephone conferencing system or voice network, initiate one or more first actions;

log information regarding the call to a log file or a database system;

analyze the logged information to generate historical data associated with one or more of the at least one party, an account with the telephone conferencing system or voice network that is used by the at least one party to initiate the call, a conference bridge used by the at least one party to initiate the call, at least one destination party connected by the call, or at least one location associated with each party;

determine one or more weighted measures associated with each generated historical data; and generate a score based on the historical data and the one or more weighted measures, the score being representative of a probability of fraudulent use or unauthorized use, wherein determining whether the call initiated by the at least one party constitutes at least one of fraudulent use or unauthorized use of the telephone conferencing system or voice network comprises determining whether the call initiated by the at least one party constitutes at least one of fraudulent use or unauthorized use of the telephone conferencing system or voice network based at least in part on the generated score.

16. The apparatus of claim 15, wherein the one or more first actions comprise at least one of temporarily blocking a network trunk; escalating disablement of a network trunk; permanently blocking a network trunk; temporarily blocking an account with the telephone conferencing system; escalating disablement of an account with the telephone conferencing system; permanently blocking an account with the telephone conferencing system; blocking one or more features of an account with the telephone conferencing system; changing routing of the call to route through specialized equipment for monitoring or recording the call; changing routing of the call to route to a call center; changing routing of the call to route to a law enforcement facility; changing routing of the call to route to a message service; changing routing of the call to route to an interactive voice response ("IVR") system; changing routing of the call to terminate the call; sending an alert regarding the call to at least one of an account owner, an account manager, a call center representative, or a law enforcement representative; sending an e-mail message regarding the call to at least one of an account owner, an account manager, a call center representative, or a law enforcement representative; sending a short message service ("SMS") message regarding the call to at least one of an account owner, an account manager, a call center representative, or a law enforcement representative; sending a text message regarding the call to at least one of an account owner, an account manager, a call center representative, or a law enforcement representative; initiating a telephone call regarding the call to at least one of an account owner, an account manager, a call center representative, or a law enforcement representative; or logging information regarding the call to a log file or a database system.

17. The apparatus of claim 15, wherein the set of instructions, when executed by the at least one processor, further causes the apparatus to:

provide a trunking bridge between the at least one party and the telephone conferencing system or voice network, wherein the trunking bridge comprises one of a public switched telephone network ("PSTN") trunking bridge, an integrated services digital network ("ISDN) trunking bridge, a voice over Internet protocol ("VoIP") trunking bridge, or a session initiation protocol ("SIP") trunking bridge;

wherein the trunking bridge facilitates monitoring call activity and initiation of the one or more first actions.

18. A system, comprising:

a computing system, comprising:

at least one first processor; and a first non-transitory computer readable medium communicatively coupled to the at least one first processor, the first non-transitory computer readable medium having stored thereon computer software comprising a first set of instructions that, when executed by the at least one first processor, causes the computing system to:

monitor call activity through a telephone conferencing system or voice network;

in response to detecting use of the telephone conferencing system or voice network by at least one party based on the monitored call activity, identify at least one of incoming call data or outgoing call data associated with a call initiated by the at least one party;

analyze the identified at least one of incoming call data or outgoing call data to determine whether the call initiated by the at least one party constitutes at least one of fraudulent use or unauthorized use of the telephone conferencing system or voice network;

based on a determination that the call initiated by the at least one party constitutes at least one of fraudulent use or unauthorized use of the telephone conferencing system or voice network, initiate one or more first actions;

log information regarding the call to a log file or a database system;

analyze the logged information to generate historical data associated with one or more of the at least one party, an account with the telephone conferencing system or voice network that is used by the at least one party to initiate the call, a conference bridge used by the at least one party to initiate the call, at least one destination party connected by the call, or at least one location associated with each party;

determine one or more weighted measures associated with each generated historical data; and generate a score based on the historical data and the one or more weighted measures, the score being representative of a probability of fraudulent use or unauthorized use;

wherein determining whether the call initiated by the at least one party constitutes at least one of fraudulent use or unauthorized use of the telephone conferencing system or voice network comprises determining whether the call initiated by the at least one party constitutes at least one of fraudulent use or unauthorized use of the telephone conferencing system or voice network based at least in part on the generated score.

* * * * *